(12) United States Patent
Nasserbakht et al.

(10) Patent No.: US 8,495,020 B1
(45) Date of Patent: Jul. 23, 2013

(54) MOBILE INFORMATION SYSTEM

(75) Inventors: Gitty N Nasserbakht, Los Altos, CA (US); Mitra Nasserbakht, Los Altos, CA (US)

(73) Assignee: Enorcom Corporation, Los Altos, CA (US)

( * ) Notice: Subject to any disclaimer, the term of this patent is extended or adjusted under 35 U.S.C. 154(b) by 921 days.

(21) Appl. No.: 12/163,973

(22) Filed: Jun. 27, 2008

Related U.S. Application Data

(60) Provisional application No. 60/946,618, filed on Jun. 27, 2007, provisional application No. 60/965,104, filed on Aug. 17, 2007.

(51) Int. Cl.
*G06F 17/30* (2006.01)

(52) U.S. Cl.
CPC ................... *G06F 17/30076* (2013.01)
USPC .......................... 707/640; 707/711

(58) Field of Classification Search
CPC .................................. G06F 17/30076
USPC ................................. 707/711, 640
See application file for complete search history.

(56) References Cited

U.S. PATENT DOCUMENTS

| | | | |
|---|---|---|---|
| 6,169,575 B1 * | 1/2001 | Anderson et al. | 348/231.2 |
| 6,434,668 B1 * | 8/2002 | Arimilli et al. | 711/128 |
| 6,487,561 B1 * | 11/2002 | Ofek et al. | 1/1 |
| 6,810,414 B1 * | 10/2004 | Brittain | 709/219 |
| 7,047,236 B2 * | 5/2006 | Conroy et al. | 1/1 |
| 7,636,733 B1 * | 12/2009 | Rothmuller | 382/305 |
| 7,831,264 B2 | 11/2010 | Miegel | |
| 7,930,629 B2 * | 4/2011 | Hurst-Hiller et al. | 715/234 |
| 7,956,742 B2 * | 6/2011 | Lupoli et al. | 340/572.1 |
| 8,311,513 B1 | 11/2012 | Nasserbakht et al. | |
| 2001/0041056 A1 * | 11/2001 | Tanaka et al. | 386/95 |
| 2003/0033296 A1 * | 2/2003 | Rothmuller et al. | 707/3 |
| 2004/0167938 A1 * | 8/2004 | Margolus et al. | 707/203 |
| 2006/0068812 A1 | 3/2006 | Carro et al. | |
| 2007/0032240 A1 | 2/2007 | Finnegan et al. | |
| 2007/0260862 A1 * | 11/2007 | McFarling | 712/240 |
| 2007/0273518 A1 * | 11/2007 | Lupoli et al. | 340/572.1 |
| 2007/0300164 A1 | 12/2007 | Bhogal et al. | |
| 2008/0005087 A1 | 1/2008 | Sato et al. | |
| 2008/0168135 A1 * | 7/2008 | Redlich et al. | 709/204 |
| 2008/0201302 A1 * | 8/2008 | Kimchi et al. | 707/3 |
| 2008/0243696 A1 | 10/2008 | LeVine | |
| 2010/0058106 A1 * | 3/2010 | Srinivasan et al. | 714/2 |

OTHER PUBLICATIONS

Bloehdorn, Stephan, et al., "TagFS—Tag Semantics for Hierarchical File Systems", WWW 2006, Edinburgh, UK, May 22-26, 2006, pp. 1-6.*

Patel, Shwetak N., et al., "The ContextCam: Automated Point of Capture Video Annotation", UbiComp 2004, LNCS 3205, Springer-Verlag, Berlin, Germany, © 2004, pp. 301-318.*

Abowd, Gregory D., et al., "The Family Video Archive: An annotation and browsing environment for home movies", MIR '03, Berkeley, CA, Nov. 7, 2003, pp. 64-65.*

Microsoft Computer Dictionary, 5th Edition, Microsoft Press, Redmond, WA, © 2002, pp. 148-155.*

* cited by examiner

*Primary Examiner* — Shahid Alam
(74) *Attorney, Agent, or Firm* — Schwegman, Lundberg & Woessner, P.A.

(57) ABSTRACT

A time-based intelligence system provides robust storage, access, and processing of information on a mobile device. An automated mobile assistant system provides automated, proactive and anticipatory services for the user of the system. In an example, a customizable personal mobile device for communication and organization can include a core engine and a plurality of modules coupled to the core engine to perform a different one of a plurality of classes of functionality of the mobile device, where each said module includes a processing element and memory dedicated for use by said module.

31 Claims, 31 Drawing Sheets

| PAST / | PRESENT / | FUTURE / |
|---|---|---|
| Statistics | Immediate Direction | Plans |

Vertical Viewing of Time-Sector Activities

DAY VIEW:

| APPTs | STATS | | | AUDIOS |
|---|---|---|---|---|
| CALLS | | PROGRESS TRACKING | | STILLS |
| EMAILS | PLANS | | | VIDEOS |
| | ALERTS | | | |
| | NEWS | | | |

Fig. 13

MOBILE INFORMATION SYSTEM

This application claims the benefit of Provisional U.S. Patent Application No. 60/946,618, filed on Jun. 27, 2007, and Provisional U.S. Patent Application No. 60/965,104, filed on Aug. 17, 2007, both of which are incorporated herein by reference.

FIELD OF THE INVENTION

At least one embodiment of the present invention pertains to mobile electronic devices for communication, entertainment, and/or organization such as advanced mobile phones and other similar devices, and more particularly, to a mobile device with customizable functionality and form factor. At least one embodiment of the present invention pertains to a time-based intelligence system for storage, access, and processing of information on a mobile device. At least one embodiment of the present invention pertains to a mobile electronic assistant system. The automated assistant provides automated, proactive and anticipatory services for the user.

BACKGROUND

Consumer electronic devices such as mobile electronic devices have undergone significant technological advances in recent years. Availability of advanced silicon technology, processing power, memory and advanced input/output (I/O) and display systems as well as an increasing level of communication bandwidth including next generation wireless cellular as well as WiFi/WiMax wireless broadband technologies enable the building of more-sophisticated devices.

Currently the majority of device innovations concentrate around increasing the computing capability of wireless handsets. In some cases, wireless handsets of today are more powerful than supercomputers of decades ago. More memory, processing power and bandwidth are available today, and the end consumer is able to generate and receive orders of magnitude more information compared to just a few short years ago. However, innovations in the areas of customization, organization and advanced services remain behind the computational power increases. In fact, since the first major PDAs were introduced nearly 20 years ago, there has been little done to solve the organizational needs of consumers besides having access to an electronic version of a paper calendar. Despite the many available electric devices, the majority of the population is still relying on paper calendars due to their ease of use, reliability and lower cost and the few additional benefits offered by their electronic counterparts.

SUMMARY

One aspect of the techniques introduced here is a method of capturing and scheduling user-requested personal services via a mobile device, an electronic access device or the worldwide web.

Another aspect of the techniques introduced here is a method of automated information exchange via any common format for the purpose of scheduling individual calendar entries via a mobile device, telephone or world wide web initiated data or voice communication channel.

Another aspect of the techniques introduced here is a mobile device enabling the sharing of schedules among a set of users of services with dynamically updated timing and event information as included in a user's profile.

Another aspect of the techniques introduced here is a mobile device service enabling proactive collecting of information relevant to the user based on user input, past activity, current schedule and/or future plans.

Another aspect of the techniques introduced here is a mobile device performing security breach anticipation and a multi-level security breach handling procedure based on user location, activity, proximity, environmental and/or biological information.

Another aspect of the techniques introduced here is an operating environment for an electronic device with ability to customize user-interface functionality, location, look and appearance of buttons.

Another aspect of the techniques introduced here is an operating environment for an electronic device with of viewing and access of all communication, content and event and services at once.

Another aspect of the techniques introduced here is an operating environment for an electronic device enabling instant viewing of past statistics, present schedule and future plans.

Another aspect of the techniques introduced here is an operating environment for a mobile device with News and Alerts tickerline showing all "user-relevant" News and Alerts, continuously updated.

Another aspect of the techniques introduced here is a method of defining and viewing Alerts/News based on $, T, E (money, time, event) in a mobile device.

Another aspect of the techniques introduced here is an operating environment for a mobile device with organization of lists of groups and one-step method for contacting them.

Another aspect of the techniques introduced here is a directory for a mobile device with temporal, location and contextual data for each entry including but no limited to relationships, known since, call/msg history.

Another aspect of the techniques introduced here is a method of transmitting and receiving location identification information in a mobile calling environment.

Another aspect of the techniques introduced here is a location and context dependent receipt of calls and messages in a mobile user's environment.

Another aspect of the techniques introduced here is a method of receiving calls to one phone number on multiple devices and method of receiving calls to multiple phone numbers on one device in a mobile user's environment.

BRIEF DESCRIPTION OF THE DRAWINGS

One or more embodiments of the present invention are illustrated by way of example and not limitation in the figures of the accompanying drawings, in which like references indicate similar elements and in which:

FIG. 13 shows a unified access view presented by the UI;

DETAILED DESCRIPTION

Figure 1:
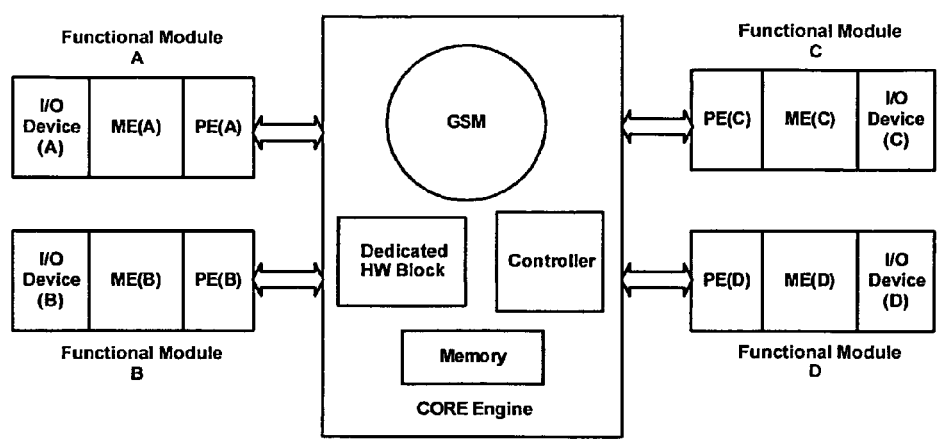
FIG. 1 is a block diagram showing an example of the architecture of a mobile device in accordance with the techniques introduced here.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

The techniques introduced here include a robust solution for addressing the organizational needs of mobile consumers by providing, among other things, an automated assistant system ("active secretary") which provides proactive and anticipatory services and life-management solutions for the consumer on the go. The automated assistant can run on a customized mobile device platform, referred to as customized mobile device herein, and can use a Time-based Intelligence System (TIBIS) that allows for robust storage, access, and processing of information on the mobile device. Security features at the mobile device and on the server side can provide additional security and privacy for consumers.

A "mobile device", as the term is used herein, means any device that is designed to be worn by a person, carried in an article of clothing or personal accessory (e.g., a purse), or easily carried in one hand by a person. As noted above, the functionality needed by the majority of users of mobile devices does not include an arbitrarily large number of features and applications. Having the technology for massive computation assembled at many places, it is desirable to alleviate the mobile device from area- and power-consuming functionality that is available almost everywhere. In its place, it is desirable to make the mobile device perform the functions that are essential for mobility (e.g. voice, text, video capture, storage and display, etc.) in the most robust fashion.

(1) Mobile Device with User-Customizable Functionality

The present invention offers consumers the ability to choose the functionality and form factor they desire in a mobile device. Each of these modules may be dedicated to perform a specific type of user-level functionality, such as voice communication, text, video capture, storage, display, location determination, games, etc. "User-level" functionality means functionality that is directly perceivable by a human user of the device.

The approach introduced here allows users the flexibility of using the components that they need and none of the ones that they do not need, allowing for customizability and reduction in cost and power dissipation.

The customized mobile platform introduced here allows people to communicate, entertain, and organize their mobile life. The mobile device uses "ultra thin client" architecture with custom-designed dedicated hardware for functions that need to be performed on the handset. The design removes the need for a multitude of programmable multi-function cores. This architecture results in high performance, fast response time, and very low-power consumption. In addition, this architecture allows users access to a rich set of customized applications based on their needs from the network, if needed.

One aspect of the customized mobile device is a modularized architecture for a mobile device ("Modularized Mobile Architecture"). The modularized nature of this architecture allows for the ability to choose the functional modules that are combined to make a mobile device. This gives the ability to exchange and upgrade the functional modules over time. For this functionality, customization and flexibility, a level of service is established with the customer (user) making the device of their choice and giving the customer the ability to upgrade easily over time. For example, one functional module may be a communication module, which can be upgraded if a faster communications technology becomes available to the user, without the need to discard the entire mobile device.

FIG. 1 shows a block diagram of the Modularized Mobile Architecture according to one embodiment. The architecture separates out the functional blocks for each major device function and removes large, power consuming general purpose processors as well as the accompanying shared memory hierarchy. Each functional module has its own dedicated processing element (PE) and memory element (ME). The PE in each functional module can be, for example, a programmable microcontroller, application-specific integrated circuit (ASIC), programmable logic device (PLD), or other similar device or a combination of such devices. The ME in each functional module can be, for example, random access memory (RAM), read-only memory (ROM), flash memory, or other type of memory, or a combination of such types of memory.

The functional modules can include, for example, any one or more of: a communication module (e.g. 3G), audio module, video module, GPS module and game module. By optimizing the PE to the specific functions being performed by its functional module, it is possible to reduce the underlying area and power consumption of each functional module.

By providing separate memory for each functional unit, the majority of issues with memory bottleneck are eliminated.

Each functional module has its own dedicated memory and MEs are not shared resources, as is the case in traditional architectures. In other words, instead of separate memories for Instruction and Data for the whole system, this architecture allows for separate memory for each application-specific area for the mobile space.

This approach has many advantages over traditional architectures. It allows for robust information sharing mechanism among functional modules. In addition, it is possible to make significant improvements to the choice of technology used for the memory blocks to properly optimize for the type of data being stored in that specific memory element. Depending on the type of stored data and usage patterns, it is possible to vary the block size and read and write specifications of each memory element. The architecture preserves and enhances the functionality of each individual functional unit while allowing these units to communicate with extremely low overhead.

The Core engine is a very efficient hardware-optimized engine that facilitates the communication between the modules and provides the central functionality of the mobile device. The mobile device is designed to accommodate specific functionalities for the mobile environment rather than provide unlimited programmability. The significant manipulations of data that occur in the mobile device are a set of operations designed for the functionality of the device, such as the following:

CAPTURE
STORAGE
RETRIEVAL
SEARCH
DISPLAY
TRANSMIT

Making these operations extremely efficient and not allocating resources for unused functionality greatly reduces cost, increases performance significantly and reduces power utilization. In a simplified manner, the core engine implements a Giant State Machine (GSM) which is designed to control the device functionality in very high speed in hardware.

The Modularized Mobile Architecture allows for robust and intelligent sharing of information among functional modules instead of sharing resources, and it resolves one of the major overheads associated with management of shared resource. A major part of the tasks performed by a traditional operating system (OS) is resource management and interrupt control. This allows the system to manage access to shared resources such as memory. In the Modularized Mobile Architecture introduced here, the significant computational overhead associated with a traditional OS as well as the memory requirements to store active as well as passive components of such OS is eliminated.

The memory architecture is designed so that a small portion of the memory contents in each functional module, namely a set of extracted and stored "tags", are communicated to the core engine and to other functional modules as needed (the memory architecture is described below in relation to TIBIS). As a result, a very robust interface is developed between the Core Engine and each functional module. This architecture allows for robust and intelligent sharing of information instead of sharing resources.

(2) Time-Based Information System (TIBIS)

(2A) Event-Based Storage, Access & Retrieval

The techniques introduced here include TIBIS, a time-based information system of data organization. TIBIS is particularly suited to implementation in a mobile device such as described above, although it is not limited to a mobile environment. The current PC model of entering, saving and organizing files grew out of the transition from typewriters/word processors/calculators. Although the sophistication of file systems and their many different formats have continued to grow, the fundamental design element for these systems remain packing the most amount of information in the least amount of space and facilitate access to the information while providing data integrity based on the underlying memory hierarchy of the system. Available storage systems lack a higher level of awareness and intelligence, which is particularly evident in mobile device usage scenarios.

While "content" and general-purpose programming/flexibility for applications remains of primary concern in a PC environment, in a mobile environment the primary factor is time. People typically use mobile devices to have access to information on-the-go and to save time. Features of TiBIS allow a hardware and software environment to provide robust storage, integration, recognition, recall and display of time-based activities and events in a user-customizable format.

Currently, most data is stored in electronic form in files. These files are organized in various directories or folders based on the type of file or the relationship of the content of files. The files have a time stamp associated with them. Other than looking up the time stamp when one looks at a file, the only other thing one can do with the time stamp is to sort the files based on time in a given folder or directory.

In addition, files are randomly written in different areas of memory. When a file is deleted, an area in memory becomes available where the file was written before. As more and more files are deleted, more area opens up in memory, but the open (free) areas are not contiguous. This results in fragmentation of data in memory, which results in a slow down of data access.

With TIBIS, all files are organized based on time, with the granularity of time determined by the user. The user can have control over periodic storing of specific information, store information through a direct user command, or any other user-defined mechanism. Activities, multimedia files, etc. are organized in a time snap-shot. As new pieces of information are received or generated, they are written sequentially in memory. Since data that is recorded ("the past") cannot be modified by the user, the stored data is permanently stored in memory. This requires a large amount of memory over time. TIBIS provides a way to ease the requirements on the size of memory and store only information that the user will need in the long-term, while allowing the user to continue to have a snap-shot of all relevant information.

The TIBIS system is organized around two types of memory. One is called the Short-Term Memory (STM) and the other Long-Term Memory (LTM). Initially, information is recorded sequentially in STM. The size of STM is determined by the user and can be very short or very long, depending on the application and user preference (e.g. hours, days, weeks, etc.). During a predetermined amount of "inspection" period, the user has the option of erasing from STM any information deemed unimportant (e.g. an incoming junk email, erroneous file, etc.). In one implementation, the inspection period is chosen to be the amount of time it takes for the STM memory to be filled. At the conclusion of the inspection period, any remaining data is sequentially written to LTM. Any data that is erased from STM memory is not written in LTM. Once data is written in LTM, it can no longer be changed. The option to give the user the ability to erase LTM can be provided by an administrator of the system. If the user exercises the option to erase any part of the time snap-shot in LTM, the memory for that part can not be re-used by other data.

In addition, this memory architecture is designed to allow for user programmability of memory configuration, hybrid time-sector tagging of memory, dynamically varying the time granularity, and finer resolution time snap-shots inside another snap-shot.

In this system, problems with memory fragmentation are therefore resolved, since no rewriting is done in previous segments of memory and data is always written in contiguous sections of memory. In addition, since the memory is written sequentially based on time, one needs to backup any part of memory only once, since contents of past memory cannot be modified (except where the user is given the option of deletion). Therefore, periodic backups of data or changes to the data are not needed.

TIBIS also provides benefits for data security and information audit. Since the system stores time snap-shots, it is straightforward to review past activities and information. The system also makes it easy to audit past information and activities such as financial transactions, etc.

TIBIS also makes it possible to view a snap-shot of user's life, based on what information the user has chosen to include. This then becomes part of a digital journal of the user's life.

TIBIS removes static applications and content from being the central factor in device architecture. Instead the primary design element of the system is capturing and providing "relevant", "useful" and "timely" event information to the user. Each time snap-shot contains a record of all activities the user chooses to record, store, and/or track for the selected time granularity (e.g., daily, hourly, weekly.). A time snap-shot records all relevant information, such as physical location coordinates of the mobile device (or other type device that is implementing TIBIS), any information received, transmitted, captured, created or opened by the device, conversations of the user, etc. The information can include any type of multimedia data such as audio, video, email, text, etc. The system has provisions for a set of information repositories that include all files of the appropriate type (e.g., an audio repository includes all audio files generated, received or stored by the user).

Figure 2:
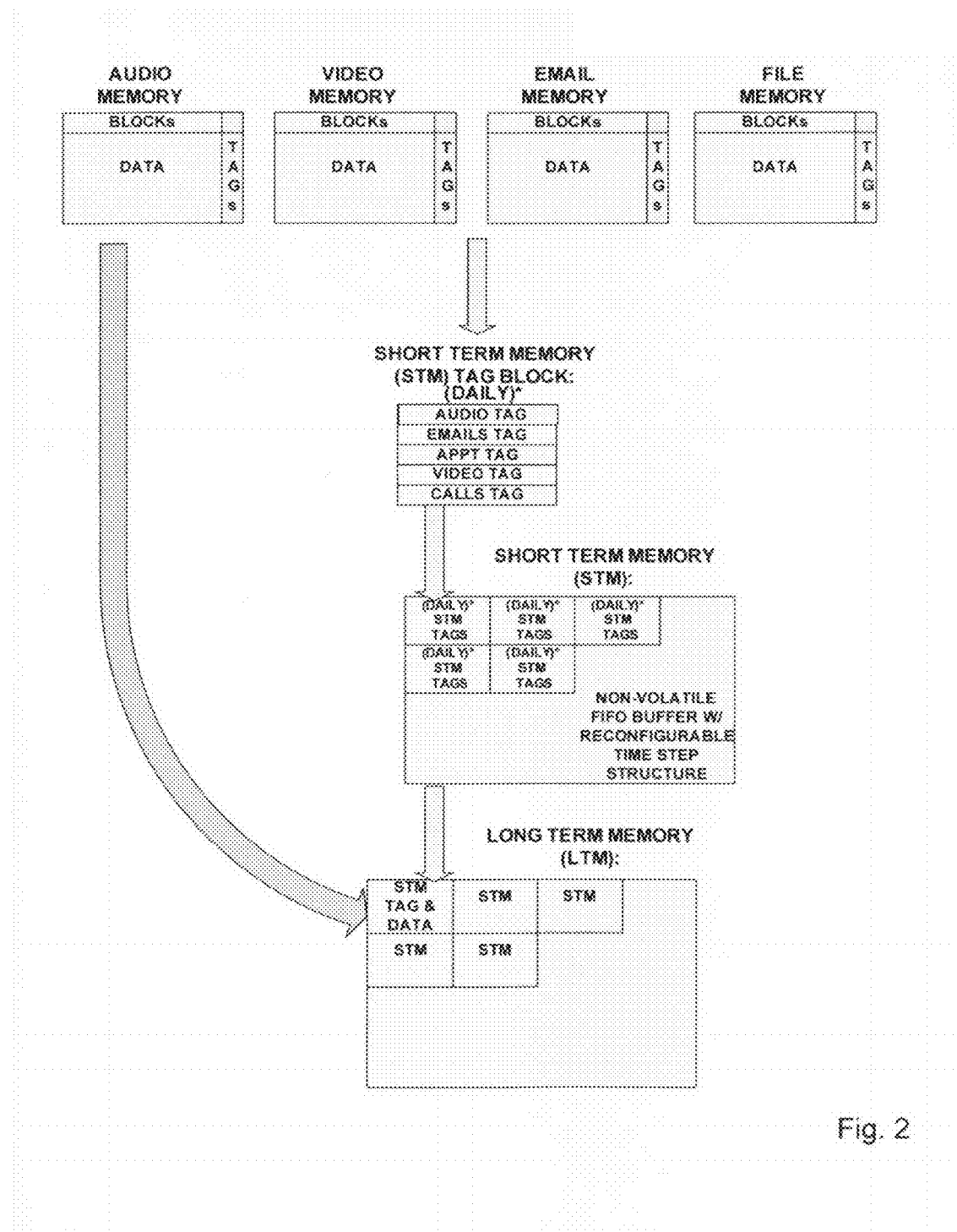
FIG. 2 is block diagram illustrating the Horizontal Repository Architecture.

FIG. 2 shows an embodiment of the Horizontal Repository Architecture (HM) of TIBIS. Each functional module (e.g., audio, video, e-mail, etc.) of the mobile device (or other type of processing system implementing TIBIS) has its own separate memory. Each stored content item also has a tag which lists all the relevant information (metadata) for that item, which is stored along with the item in a repository. All of the tags from each function's memory are collected for the selected time period (e.g., daily) and stored together as a super-block, or "time snap-shot", in STM. At the appropriate time (e.g., when STM is reaches a pre-defined time limit), in one embodiment the user is prompted to examine the tags and determine which contents and tags they wish to preserve. In the absence of additional user input, the mobile device makes the decision based on an initial programming default. In the aforementioned embodiments, the chosen contents of STM along with the accompanying data as chosen by the user are written to LTM, and STM is cleared or overwritten. In another embodiment, the data moves through a window of a given STM cycle, e.g. 30-days, while at the same time each time snapshot (e.g. daily) is transferred to LTM in a first-in first-out (FIFO) output manner. The time snap-shot has links to any blocks of data in the relevant repository that is accessed in the given time period. When data is moved to LTM, all content is saved in the LTM entry or the user can choose to keep only the pointer to the content in the repository.

Memory Hierarchy & Time Based Architecture

In implementing this unique storage and retrieval technology, HM units for each device are provided to match the device's storage and access requirements. This means that individual functions' memory storage can be changed over time, and different or same memory technologies may be used for different types of data storage and access requirements.

Figure 3:
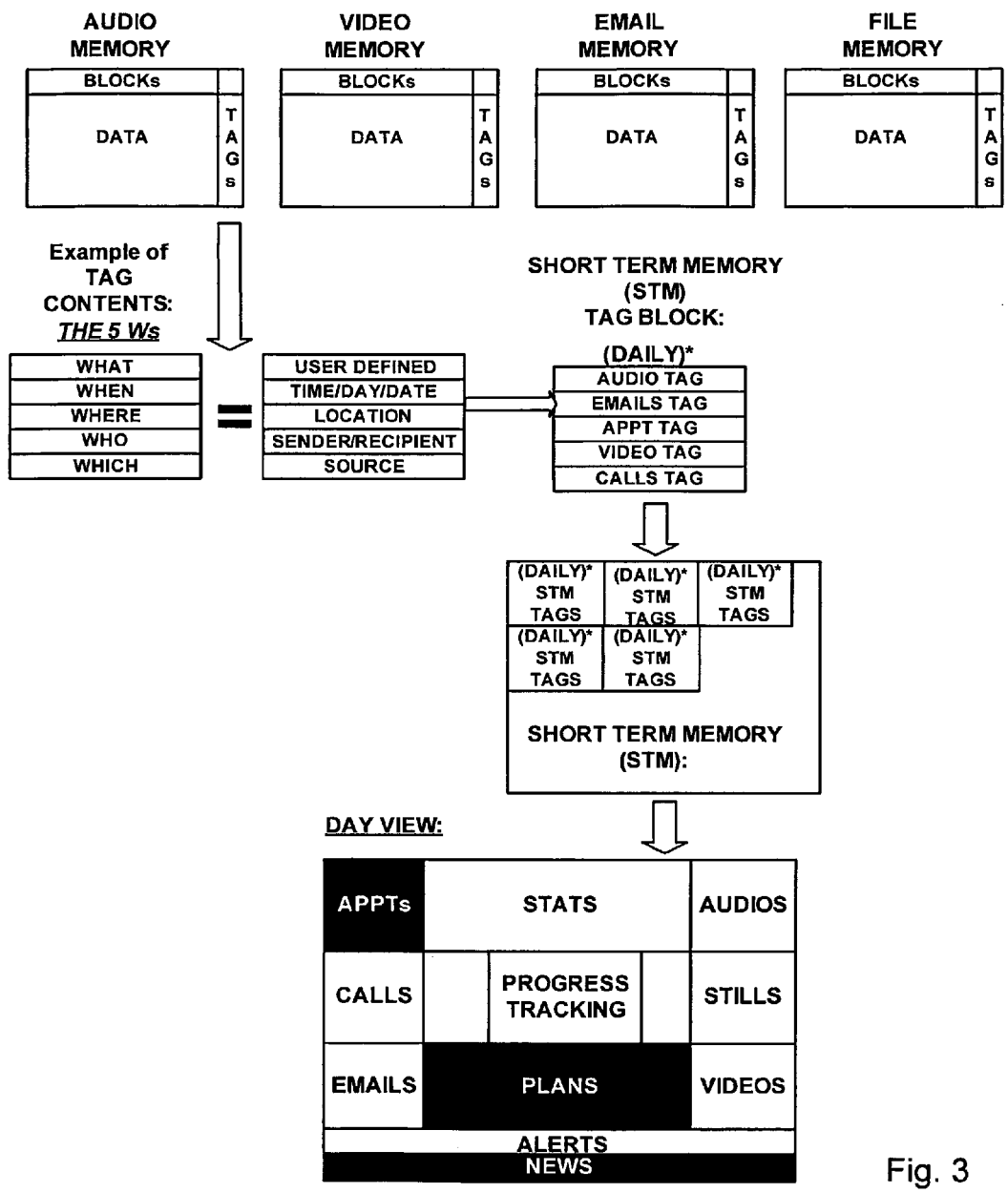
FIG. 3 shows an example of the generation and processing of tags in the time-based memory organization.

In addition to providing distinct and in some cases detachable, removable, expandable HM memory units, each stored item such as data, music, still photo or video is stored with a particular tag structure. FIG. 3 shows the generation and processing of tags in the time-based memory organization. Each tag is appended to the actual stored element in a predetermined set of extended locations. A tag typically includes metadata that answers one or more of the five questions: "what" (can be user-defined), "when" (e.g., time/day/date), "where" (location of the device), "who" (e.g., sender and/or recipient of a message) and "which" (e.g., source). Each function of the device (e.g., audio, video, etc.) generates its own type of tag. For a given time period (e.g., one day), the various tags are collected into a single tag block, which is saved in STM. Note that there can be more tag categories than the above suggested five for certain applications.

The contents of STM can therefore be used to provide a complete "day view" to the user for multiple days, or similar view for any other selected time period. Upon a request for retrieval of data, a fast search mechanism is then able to retrieve the data element by hardware, and in some cases software, by comparing only the tags of data elements. In case a tag comparison results in multiple hits, the reduced set of data elements (tag hits) is then subjected to a further search in a much reduced complexity and time.

An example of a simplified tag generation scheme is as follows: Upon taking a photograph with the still camera module, the location coordinates are retrieved automatically via the on-board GPS location module. This information is then cross-referenced against the personal address space of the user as well as the calendar information to determine the exact location where the user is likely to be. This can be further clarified by posing a question to the user for a final clarification. The "actual" verified location is then part of the tag associated with the photograph. Further, the time and date is known, which is cross-referenced against the user's calendar and "dates of importance" file in the user preferences directory. This clarifies the exact occasion and can be even further clarified by posing a question to the user. This information also becomes part of the tag. In trying to retrieve or recall the photo, the user only needs to remember a part of the tag to be able to access the desired photo or information in general.

Further features of the tag can include character recognition as well as pattern and voice recognition. Upon storage, a sample of all such available modalities of the file becomes part of the tag. In recalling this information or in trying to organize and archive, over time user preferences can be allowed to change to include something such as presence of a certain person in the photo, rather than using the more simplified versions of the tag.

If a typical storage element (type of file element) for a module is, for example, 256 bits and a memory word is 16 bits, then it takes 16 rows of data to store this element. If the design parameters allow up to 20 bits for the data and tag space, then up to 64 bits can be used for a tag (4 bits*16 words). If the storage element is 1 Kb for the same overall bit width of 16+4, then one needs 64 words to store that element. In this case one can have up to 256 bits for a tag.

In general, the tags are uniformly designed so that for most data types and functional modules, one can go up to a certain maximum size tag. For example, if all one needed is 64 bits, then for the rest of the words, the tag can be either repeated or driven to an agreed upon level. The implementation is design dependent.

In certain embodiments, a tag is proportionally as wide as the ratio of its functional module's typical data element size to the maximum required tag size. In this case the tag and data are proportionally assembled and disassembled. In other embodiments, the tag may get appended to the first or last data word and recognized with an end-of-element flag. In yet another embodiment, the tag always gets stored in its entirety and then the data element begins.

In certain embodiments, the tags are fixed in size and the memory word size and depth is a design element based on each module's typical element size and timing requirements for the control signals. In some cases, the row of data to tag ratio is determined specifically for each functional module and data type. Hence, customization happens at the module level even for memory.

One of the tasks handled by the core engine is assembling the STM blocks and coordinating the transfer of information to the LTM blocks. In addition, once the tags are generated and STM blocks are assembled, the core engine has access to a lot of well-organized information which forms the basis of efficient operations for robust organization and planning. These operations are controlled by the core engine.

Figure 4:
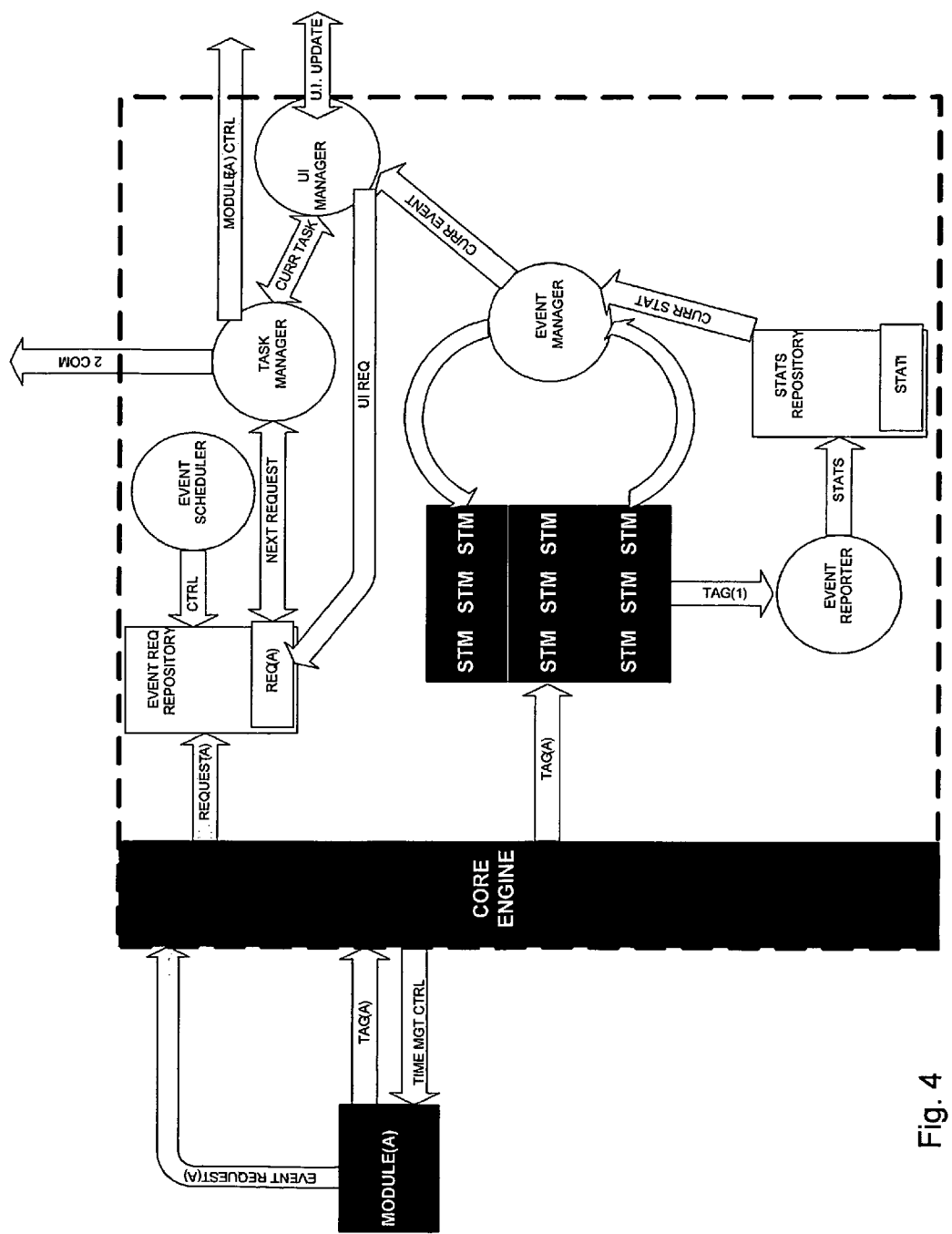
FIG. 4 shows the TIBIS operations facilitated by the core engine.

FIG. 4 shows TIBIS operations that are facilitated by the core engine. As shown, the main functions/sub-modules of the core engine (which is represented by the dashed box) are:

Event Reporter: Collects information from stored tags and generates statistics on specific categories.

Event Manager: Monitors all current and short term plans and updates the timing schedule.

Event Scheduler: Monitors all module and machine generated requests for automated actions and places entries in the schedule.

Task Manager: Collects all requests for automated user and machine generated tasks and contacts the communications module for data, voice communication when available to perform automated tasks.

Module Data Manager and Module Tag Manager: Generate control signal to release data to/from the data exchange block and send and receive tag information from specific modules to the Core engine to perform TIBIS related tasks.

User Interface (UI) Manager: Interfaces all time/event management functions to the user interface blocks driving this information to the user interface based on user request profiles. The UI Manager block takes the prioritized tasks and events as well as "stats" and "plans" supplied by the elements in the GSM engine and displays the information according to a pre-selected format onto the display.

Store-Well, Retrieve-Well

The current state of the Internet is an excellent example of what happens when all sorts of information is made available to everyone; the problem is how does one find what one is looking for. Design of the next level of search algorithms, semantics web, video search, etc. is well under way, and undoubtedly there will be improvements. It remains a fact, however, that information is being added to the Web at a far greater rate than the rate at which the algorithms are improving.

This problem can be addressed by an integrated solution that will now be described. For organization and storage, the solution introduced here provides a mechanism to collect enough information from the user to be able to automatically store the information in an appropriate manner and retrieve it easily without resorting to a complex and computationally intensive search. Even though it is comfortable to talk about "locations" when discussing files and information (something inherited from folders in file drawers days), it is becoming irrelevant and quite limiting to discuss locations when there are millions of files and bits of information generated every hour. It is more appropriate to understand the uniqueness of each multimedia file as it is received/acquired and store it in a way that future retrieval is seamless to the user and archiving, backup, deletions, etc. happen automatically. Such an approach increases productivity while reducing security and accessibility issues.

Figure 5:
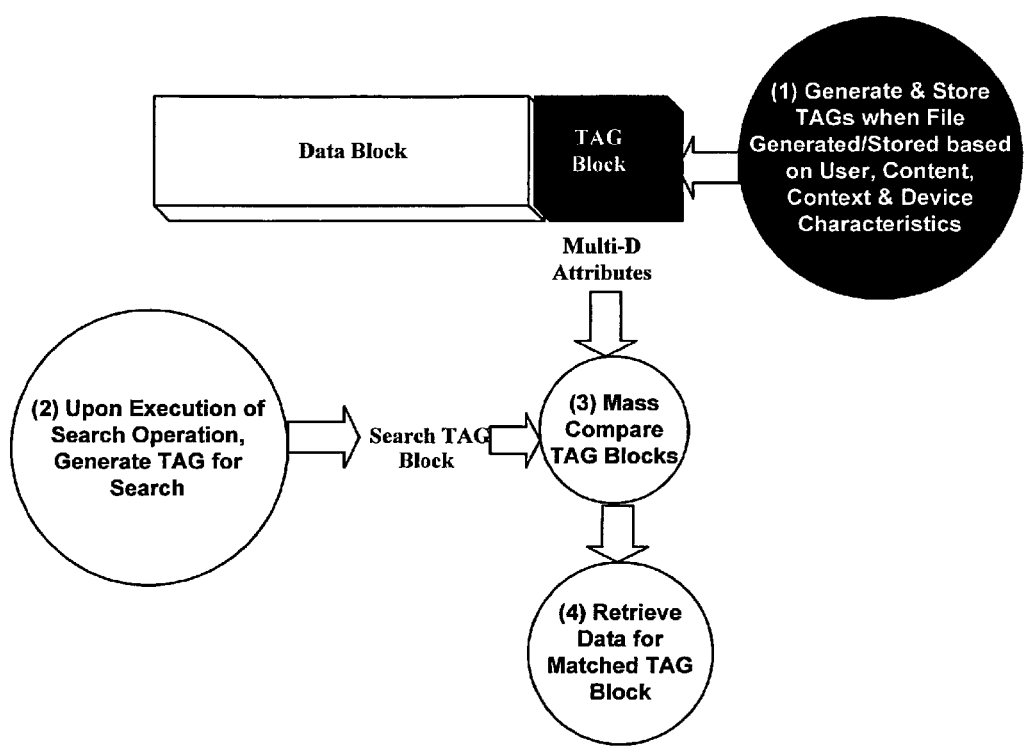
FIG. 5 illustrates an example of an algorithm for tag and content searches.

As described above, based on information type, user selection, activity and usage model the system generates and updates multi-dimensional tags for each piece of information (e.g. audio file, email, etc.) that the system handles. For each search/inquiry, a corresponding search tag is generated. The search tag is compared with the stored information tags by in at least some instances by hardware resulting in a very fast search. Content addressable memory (CAM) technology can be used to provide high-speed implementation. A combination of hardware and software implementation can be used for the tag and content searches in certain instances, depending on the specific nature of the search. FIG. 5 illustrates the intelligent storage, search and retrieval technique described here, according to one embodiment.

(3) Mobile Secretary (Life Portable™)

(3) Automated Mobile Assistant System
(3A) Automated Assistant System

The techniques introduced here include a mobile assistant system which performs automated assistant services for the user. The system comprises a multi-dimensional, multi-modal and multi-user scheduling environment which performs automated tasks on behalf of a user of a mobile device or a registered user on an internet based service or alternatively a user of services who communicates with the main service processing center via various telephone or voice calling methods.

Figure 6:
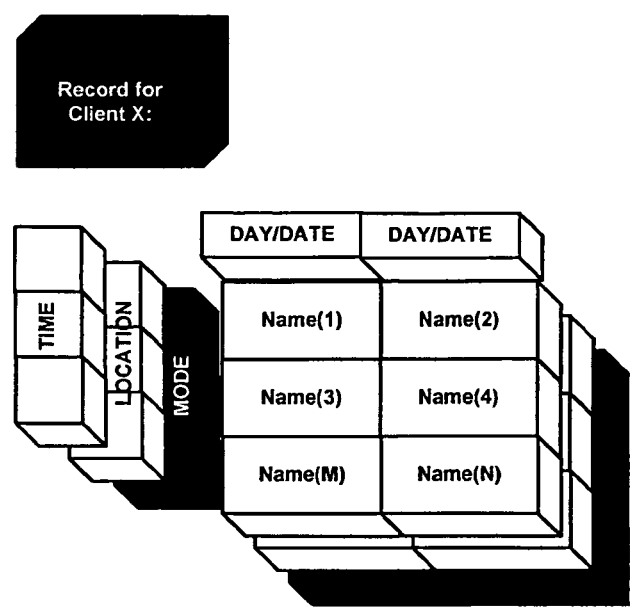
FIG. 6 shows an example of a multi-dimensional record for one client.

Using the present multi-dimensional scheduling environment a scheduling record for each client is constructed as shown in FIG. 6. FIG. 6 shows an example of multi-dimensional record for one client. Name1 to Name N are the engagements for the client. Each client's schedule is allowed to exhibit various modes such as "travel", "business", "athletics" which take into consideration the HOME base for each mode and perform proactive distance and driving calculations and notifications as well as proactive reservations, contacts notifications to name a few.

Although various members of the scheduling system are not necessarily sharing their information, the system is able to match users' and businesses' time schedules and report on possible meeting times, event times or proactively schedule those in prospective clients' time schedule.

Figure 7:
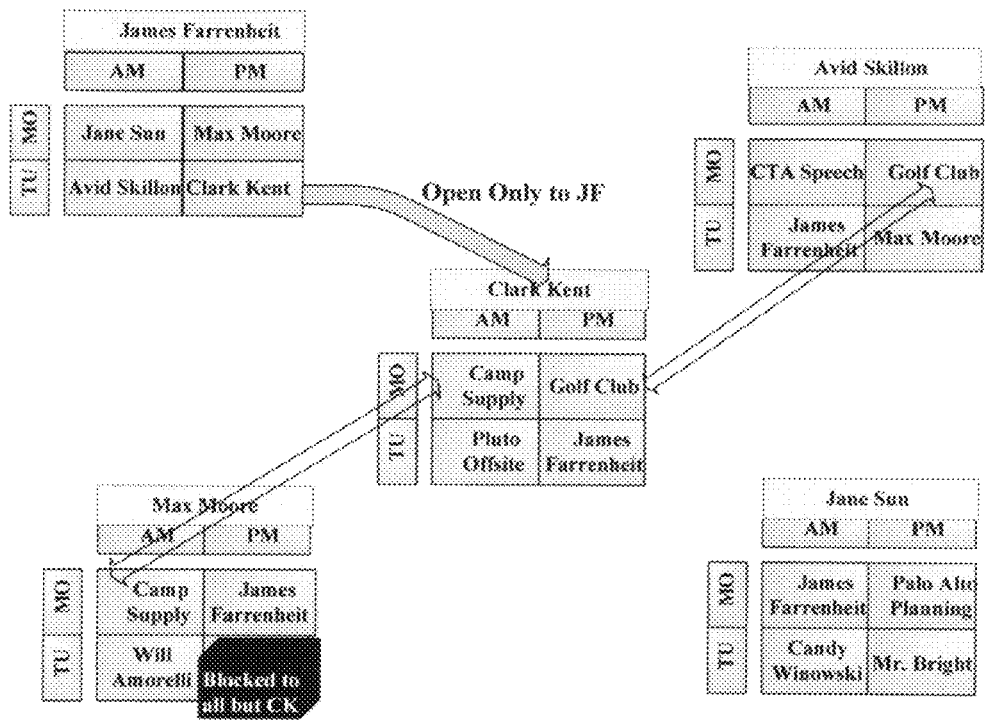
FIG. 7 shows a cluster of client databases.

The principle upon which the matching algorithms work is based on a cluster of client databases which together would comprise a web of synchronized clusters. FIG. 7 shows a cluster of client databases. There are two levels of sharing that are implemented in this scheduling system:

(1) Allowing users to share the entire schedules on the calendar, including all accompanying documents, information and tags. The user is permitted to block certain timeframes as private even to this group.
(2) Allowing specific timeframes to be open to sharing with any members of the system at large including any accompanying documents, information and tags. The user is otherwise and at other timeframes blocked to other users of the system.

These levels can be extended to encompass more sophisticated multi-level permissions as the application space warrants.

In the example shown in FIG. 7, the cluster of client databases allow James Fahrenheit to view Clark Kent's schedule directly, while Clark Kent can get two meetings scheduled with two other users without viewing their schedules via the system due to the common location and time of their presence. User Max Moore's schedule in certain time/locations is blocked to all except Clark Kent.

Figure 8:
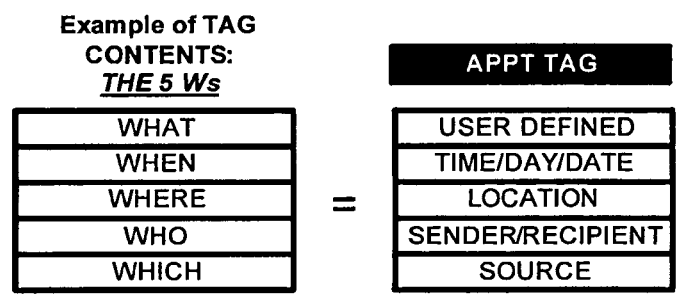
FIG. 8 shows elements of a scheduled item.

Referring to FIG. 8, each entry in a user's schedule is accompanied with a multi-dimensional tag, which in one embodiment is a five-element tag describing answers to the five key questions: "what", "when", "where", "who" and "which". FIG. 8 shows elements of a scheduled item.

This information is automatically generated at the time of creation of each data entry into the system and stored in local memory for the appointment subsystem. This is referred to as Horizontal Memory as described above. The HM stores the full content accompanied by a set of specified tags such as the ones described earlier in this section.

Using this level of abstraction, the schedule shown to the user can be used to organize items via any of these five different categories. This also enables aggregation of reports on schedules based on each of the tagged categories for past evaluations or future planning processes. These fields, called APPT TAG in FIG. 8, can be implemented with consideration given to the available storage space as well as possible number of sources available. Some fields may require less storage and some allocation can be made to future expansion capabilities.

Cross-Website Communicator Kernel

Figure 9:
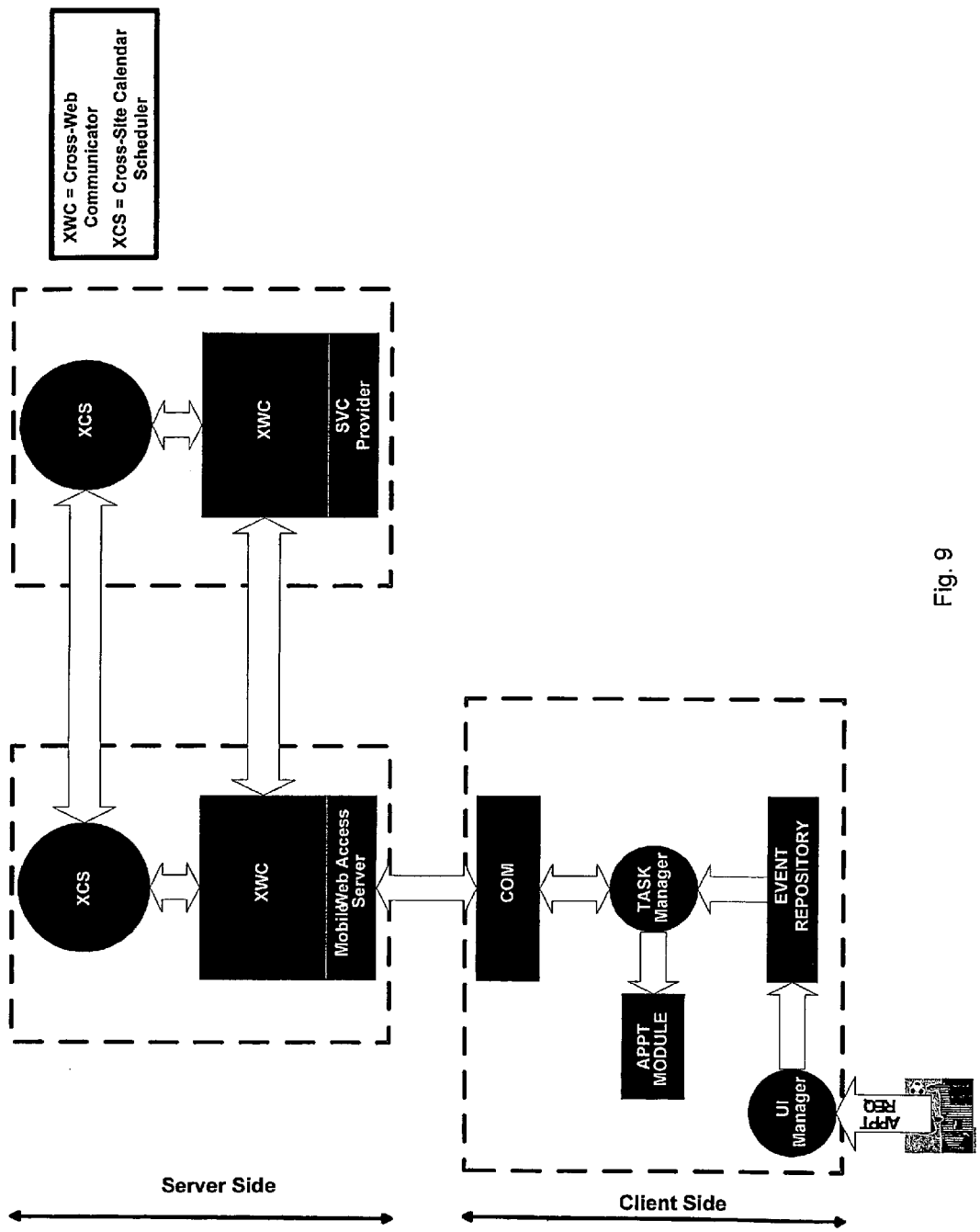
FIG. 9 illustrates an example of automated service processing.

As shown in FIG. 9, a Cross-Website Communicator (XWC) kernel is installed on targeted websites across the network (e.g., the Internet) that allows for one site to automatically communicate with other sites and perform automated tasks such as scheduling, reservations, etc. The kernel on each site will have access to the appropriate data on its site and is therefore able to negotiate various arrangements to arrive at a suitable solution. The kernel also identifies the level of access to data from incoming users and services and can choose which level of data is appropriate to be shared with the incoming requests and what type of scheduling and other services are allowed for each requestor. In one embodiment, the XWC kernel links the mobile server network to customers' third-party service providers' network.

Cross-site Calendar Scheduling Algorithm

Still referring to FIG. 9, a cross-site calendar scheduling (XCS) algorithm is an algorithm for doing automated scheduling of events, appointments, etc. Each site has a priority-coded calendar with proper access control. When an authorized entity (with the proper authorization) requests an appointment, the calendar is made available to the requester who in turn will compare the availability with that of the requester's calendar and finds the suitable match, readjusts the availability of the time slot on both calendars and resends the updated calendar. The matching and calendar updating can occur at either side depending on what makes sense (e.g. the number of users who may be accessing calendars at the same time). The preferred embodiment is to do the calendar matching and reservation on the network/stationary site where multiple users may need to access a specific calendar at the same time. In those cases, once a calendar or section of calendar is accessed for one user, other users are blocked from access until the calendar or section of calendar that is being used is updated and released.

Negotiating Algorithms:

One of the embodiments of this system is to schedule via the phone or the web the best match for time among two person's or entities timetable via a negotiation algorithm. Two such cases are demonstrated below. It should be noted that the phone version is equipped with voice recognition and automated call placement and receive capabilities at the mobile server network end. On a third party service provider's end, this may or may not be available. In case it is not available, options in the automated calling and voice features are designed to walk the person on the other end of the call to conveniently make choices and let the mobile server network know the best possible appointment option.

Phone-Link's Simplified Algorithm:

From an "Appointment Schedule" request:
1. Lookup destination contact information (contact list, web, 411 call, previous calls list, etc.) & their auto-call line (as set up by Phone-Link directory)
2. Pick first best available timeslot for the particular appointment based on preferences & travel times
3. Make call & request time based on first best time and/or non-blocked time/days
4. Negotiate until mutual free time-slot is reached
    Send first available time-slot
    Receive other side's first available
    Check availability of owner's time
    If owner available, schedule
    If unavailable, send second best available and/or ask for their second nest available & repeat
5. Notify owner of the agreed time and ask for change requests to be entered as future Appointment Schedule requests
6. Update all related directories as indicated by dependency setup file Web-Link's Simplified Algorithm:

From an "Appointment Schedule" request:
1. Lookup destination contact information (contact list, web or previous site visits' list) & Auto-Link URL (as set up by Web-Link™ directory)
2. Pick first best available timeslot for the particular appointment based on preferences & travel times
3. Connect to site & request time based on first best time and/or non-blocked time/days
4. Negotiate until mutual free time-slot is reached
    Send first available time-slot
    Receive other side's first available
    Check availability of owner's time
    If owner available, schedule
    If unavailable, send second best available and/or ask for their second nest available & repeat
5. Notify owner of the agreed time and ask for change requests to be entered as future Appointment Schedule requests
6. Update all related directories as indicated by dependency setup file Direct Match Algorithms:

Another class of algorithms may be preferred where, instead of a negotiation scheme, the two parties exchange a series of data-oriented schedules, possibly in the form of a graphical representation of the users' timetables. One such example is provided below:

Example Algorithm:
1. Lookup destination contact information
2. Set up communication link
3. Send out requested action (e.g. Person A's schedule in graphical data form)
4. Recipient pulls out requested schedule
5. Upload your schedule (Graphical calendar shows open slots (e.g. Green color), closed slots (e.g. Red color), negotiable slots based on priority (e.g. Orange color)
6. Recipient system compares the two calendars and matches two available slots that overlap, sets up the appointment for that time slot, changes the color to red (unavailable)
7. Sends the updated schedule back to the requestor
8. Update all related directories Principles:

Time Schedule Design:

All of the above works when the initial Time Schedule is constructed with automated scheduling in mind. This means based on the construction and personalization of an intelligent Preferences and Profiles system, the environment is constantly collecting and updating the information so that all key factors regarding scheduling from a human perspective are taken into account. Therefore, the intelligent construction of the Time Schedule is very important.

Proactive:

All functions are aware of the other parts and are able to gain intelligence from what is happening in other areas from hardware as well as software. If the memory usage in some part of the device is too high, it can alert the user and in some cases proactively move data across partitions to prevent loss of information. It can also use information history of activities, such as number of hours exercised to alert the user to allow the device to schedule trainer or doctor appointments.

Secure:

Every device is tagged for a specific owner with his or her own customization and personality. This makes theft and use of device by unauthorized persons impossible. In addition to the ability to remotely disengage the device from any access in case of knowledge of theft, the device is cognizant of activities that are not within the preferences files of user's indication. It can detect such cases and make back-door verification of potential foul play quite timely and easily.

The XWC Kernel and the XCS Algorithms are used to connect to desired service or information providers, download or upload information, and schedule events. This is the basis of the key automated services offered by the automated assistant system.

As part of the automated assistant system, users can get a phone access number for personal secretary services, including the ability to call and confirm their schedule for the day via an automated system. If needed, live help can be accessed. In addition, this system is available via the web and is also "active" meaning, changes and notifications can be made on the spot. These services are for times when the user does not have the mobile device with him/her or when network access in unavailable.

Under each category of service, the user is able to define the particular service, create appropriate shortcuts for such services which are directly hardwired into the device for robust performance. These services form the basis of the "Events Repository" shown in FIG. 4 managed by the GSM intelligence. Automated services are facilitated by processing of the requests on the mobile device and communicating the appropriate information to the web service to fulfill the service request. FIG. 9 shows the automated service processing between the mobile device and a third party service provider. The example shown is for an appointment request on a third party site.

Figure 10:
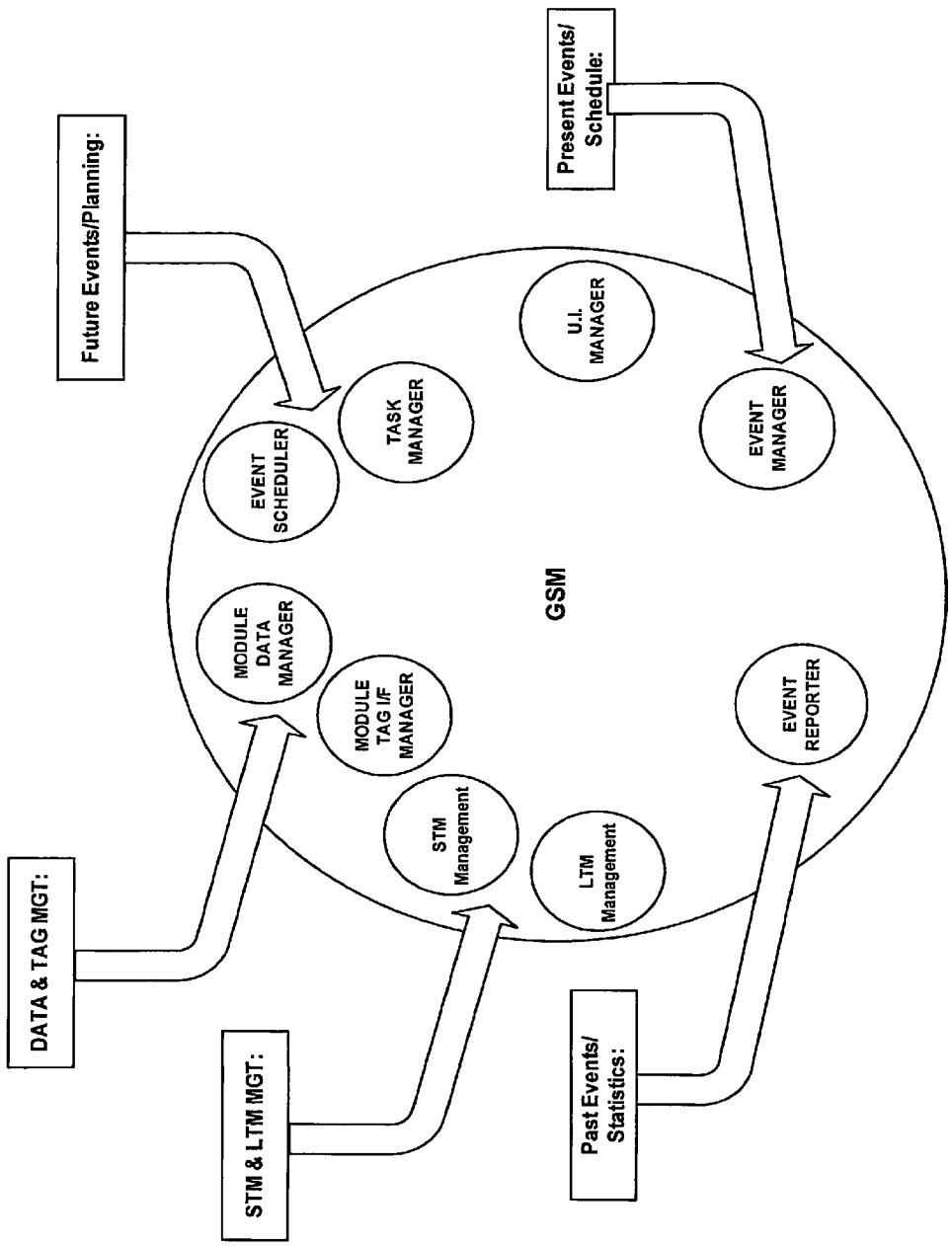
FIG. 10 illustrates shows the management functionality in the GSM.

The motivation behind this technique is to provide users with an "active organization tool." Currently digital electronics calendars offer slight improvements over traditional paper and pencil mechanisms. Some of the key element that distinguish this technique from existing techniques are that it is:
(1) Intelligent: context-aware, location-aware, and temporal-aware
(2) Proactive: master-status with respect to update events, generate alerts and modify without prompting for user input
(3) Anticipatory: designed to map future events into present and near-term tasks These characteristics are achieved in this embodiment via the TIBIS described above in this document. The overall engine controlling the control path of one embodiment of a device is depicted in FIG. 10, which shows the primary functions performing the essential operations in the device are predominately in hardware, which is implemented either in programmable or fixed logic and is accompanied by the appropriate memory blocks to accommodate the user-interface working memory as well as dedicated display memory areas. This intelligence engine is made up of a set of hardware assist functionalities embedded inside the GSM block in the Core engine. The main operations that are of interest are:

Event Reporter: Collects information from stored tags and generates statistics on specific categories.

Event Manager: Monitors all current and short term plans and updates the timing schedule.

Event Scheduler: Monitors all module and machine generated requests for automated actions and places entries in the schedule.

Task Manager: Collects all requests for automated user and machine generated tasks and contacts the communications module for data, voice communication when available to perform automated tasks.

Module Data Manager and Module Tag Manager: Generate control signal to release data to/from the Data Exchange Block and send and receive tag information from specific modules to the main core engine to perform TIBIS related tasks.

User Interface (UI) Manager: interfaces all time/event management functions to the user interface blocks driving this information to the user interface based on user request profiles. The UI Manager block takes the prioritized tasks and events as well as "stats" and "plans" supplied by the elements in the GSM engine and displays the information according to a pre-selected format onto the display.

The device UI is driven by a display driver controlled by UI Manager. The UI Interface block takes direct input from (1) UI Manager controlled by the Task Manager and the Event Manager. These functional blocks manage the past stats and future planning tasks and update the user interface directly with relevant user information (2) User defined preferences in UI user registers that are updated upon boot-up of the device and at regular user-defined intervals without booting up the device.

Figure 11:
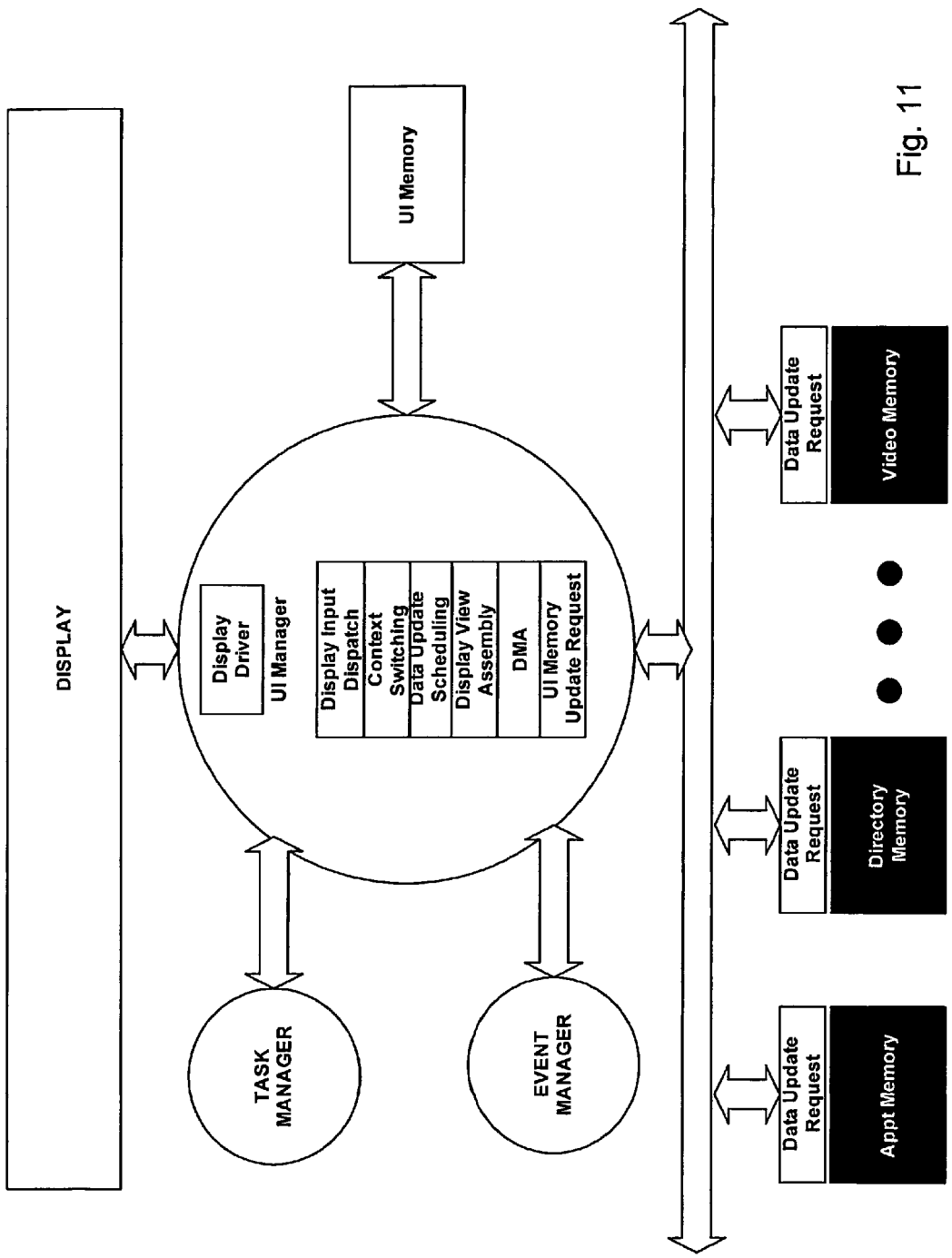
FIG. 11 shows functionality of the user interface (UI) of a device that can implement the automated assistant services.

The UI Manager block takes the prioritized tasks and events as well as statistics ("stats") and "plans" supplied by the elements in the GSM and displays the information according to a pre-selected format onto the display. This information resides in a dedicated local memory for UI. The UI manager also has access to all communication and content repository memories and tags and can display all relevant information, events, and contents that are of interest to the user simultaneously on one screen. Note that similar to an appointment, all other communications, events, contents, statistics, and planned tasks have their own specific memory (HM) with the associated tag system. Among other functions, the UI manager provides display input dispatched, context switching, data update scheduling, display view assembly and UI memory update request handling. FIG. 11 shows functionality of the user interface (UI) of a device that can implement the automated assistant services.

Figure 12:
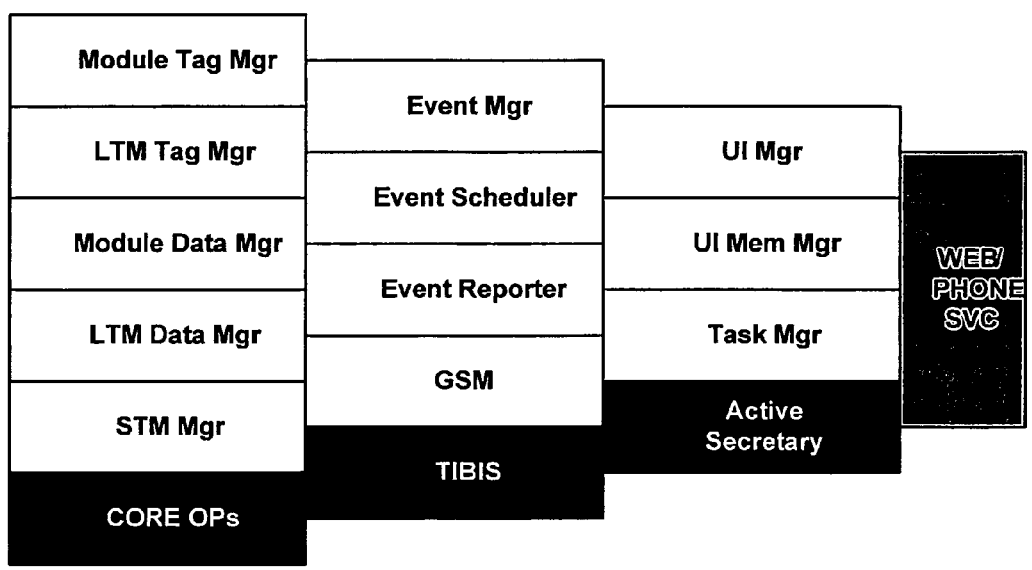
FIG. 12 shows a system level-view of hardware and software elements in a mobile device in accordance with the techniques introduced here.

FIG. 12 shows an overall system level view of functions of a mobile device such as described above, according to one embodiment. All operations within the mobile device can have a combination of software and hardware elements, with the core engine operations being primarily hardware-based. The core engine manages functional module operations and does STM and LTM management. The TIBIS engine encompasses the GSM operations within the core engine and manages the relevant operations for event handling. The Active Secretary component orchestrates the initiation and management of tasks and proper presentation of information through UI management. The Automated Assistant (Secretary) operations and the algorithms discussed above (XWC and XCS) which are representatives of the web/phone services are included in the automated assistant system.

Referring now to FIG. 13, the concept of past/present/future is built into the system. Past information provides statistics, present information provides immediate direction for tasks and events, and future information is represented by plans set by the user. FIG. 13 shows a unified access view presented by the UI. This is the output of the UI Manager as received by a display (a touch screen in this case) of a device such as a mobile device.

As shown on FIG. 13, the user has access to all communication, user content, and events in one unified view on one screen simultaneously. This capability is explained further below in the unified communications section of this description. In addition, the user can access all relevant statistics, current schedule of activities and future plans from one screen with one click, as well as view progress tracking of plan.

(3B) Automated Services

Figure 14:
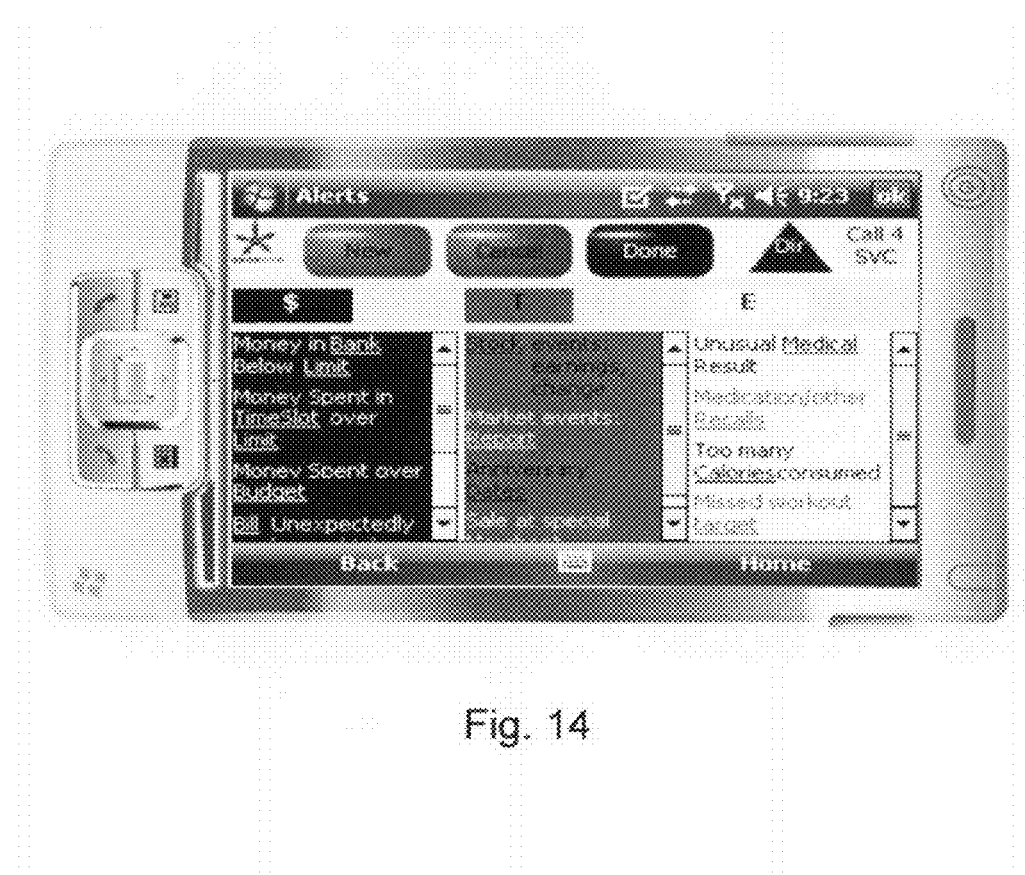
FIG. 14 shows an Alert/News setup screen of the UI.

FIGS. 14-24 show examples of various display screens that may be generated by a UI of a device (e.g., a mobile device), which illustrate various representative automated services that can be done with the device. FIG. 14 shows an Alert/News setup screen of the UI Alerts and News are generated based on user-specified parameters or proactively generated based on usage pattern or other data. The Alerts and News are defined by a set of functions based on Money, Time, and Events. If the criterion is satisfied, an Alert or News item is generated and sent to the mobile device via a rolling ticker line.

The user Sets up Alerts/News in 3 Major Categories of Money, Time & Event. The user chooses from a preselected list of action items and names, amount, etc. For example, the system can be set up to send an alert when a bill (e.g. monthly utility bill) goes above a set limit, chosen by the user, possibly implying some error in billing. If this happens, the device sends an alert message on the Alert ticker at the bottom of the screen. It is more convenient to set up News and Alerts initially on the web due to the small size of the mobile display. Under user direction, usage patterns, user location, user schedule, etc. the device can find relevant advertisements or offers and display them for the user across the Alert bar.

Figure 15:
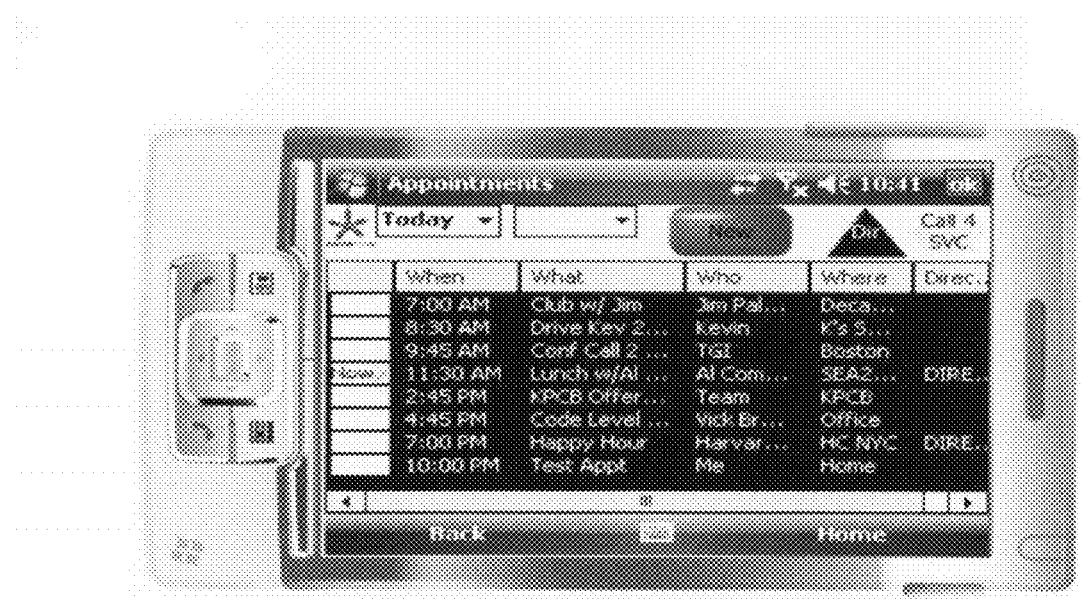
FIG. 15 shows a view of user appointments as seen on the display.

FIG. 15 shows a view of user appointments as seen on the display. Titles of each appointment along with several user-selected fields represent some of the tags used in this case.

The contents of the appointment are stored in appointments memory (in HM) accompanied by their respective tag fields. This information is processed, assembled, and fed to the data bus driving the display as part of the UI Manager block. The "Now" button is a dynamic pointer to the closest calendar appointment matching the current time of day which provides the user a useful visual queue to pay attention to the next item on their potentially busy schedule.

Figure 16:
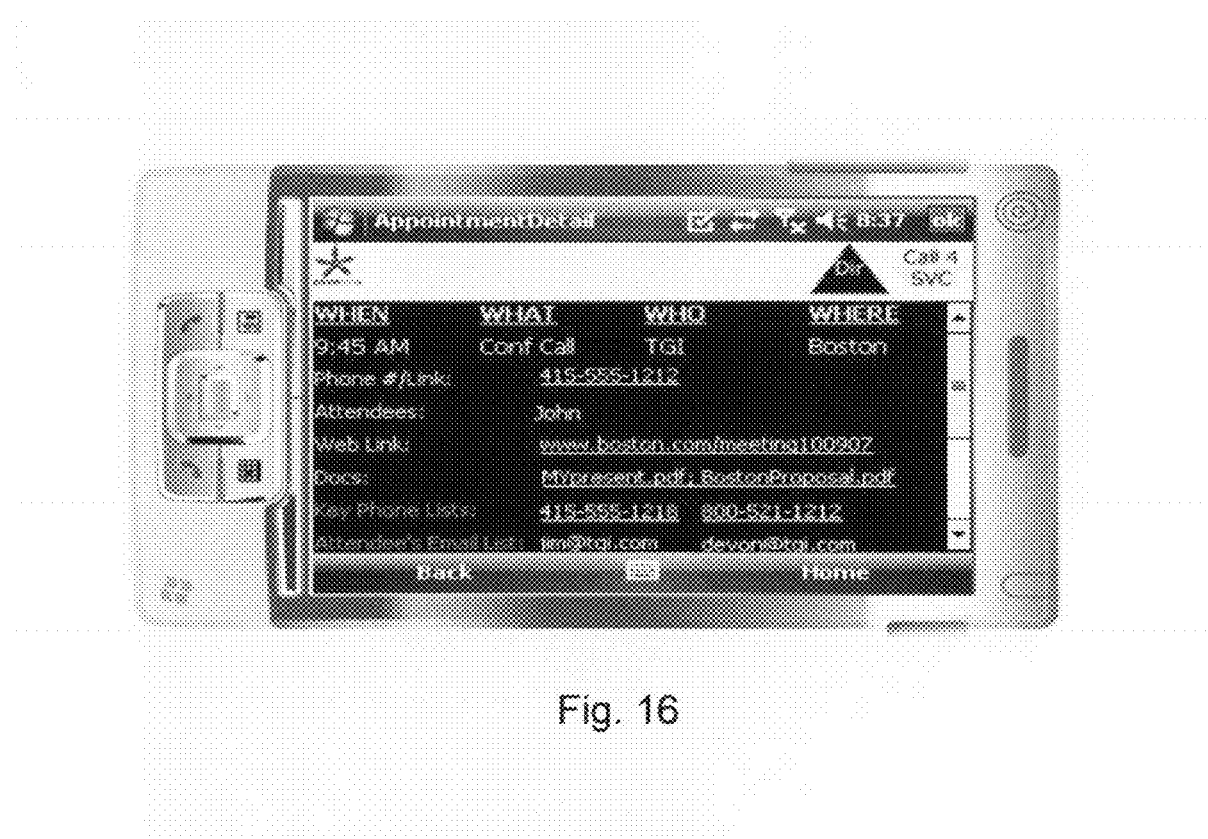
FIG. 16 shows the appointment detail for one appointment.

FIG. 16 shows an example of the appointment detail for one appointment. In one step, the user gets access to a list of details for the appointment and its relevant supporting documents. Organizers and attendees can be contacted also in a one-step process. This is accomplished seamlessly to the user due to proactive scanning of information received for specific fields, upon detection, tags are automatically generated and the information is routed to the appropriate directory residing in the appropriate memory block. For example, any contact information is routed to the Directory memory which has capability of multiple viewing mechanisms, but more relevant to this case, is linked to all other databases in a cross-reference manner.

The multi-user aspect of the scheduling system allows users to view a dynamic version of their selected group's schedule on the fly from their mobile device or the internet. In the following example, a user is able to perform this via a dropdown on top of the appointments page. This is accomplished by keeping user's information in cluster of client databases. In case of sharing requests, these databases form a web of synchronized clusters on the network. On the client side, this synchronization happens at scheduled intervals or upon finding unused communication time on client's device and sending specific appointment contents' updates to the other clients respectively. This can also be done upon request when the user asks to view this information live. There is an option for the user to drive the actual synchronization mechanism (via network, via client, live, offline (when not using the device) or at specific time each day or week.)

Figure 17:
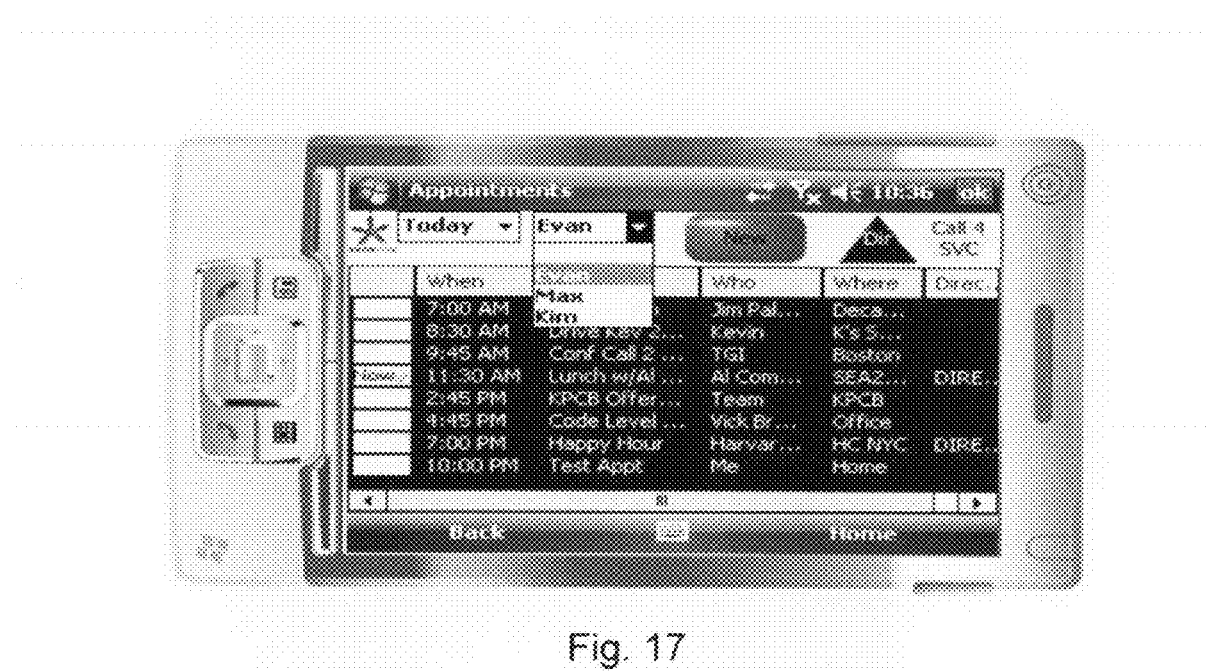
FIG. 17 shows a screen in which the user is able to view another person's schedule using a drop-down menu step.
Figure 18:
FIG. 18 illustrates the directory detail.

FIG. 17 shows a screen in which the user is able to view another person's schedule using a drop-down menu step. The device collects relevant information about contacts in the directory database. The directory database contains complete data on contacts such as date of last contact, last contact details, relationship, known since, all contact emails, calls, meetings, etc. The directory includes relationship of entries to the user and to each other. It also collects information about last contact w/the individual and any relevant information about the nature of the previous contact and how long the person has been known to the user, etc. FIG. 18 illustrates an example of a screen showing the directory detail.

The program offers a number of services. First, it organizes all useful information in easily accessible formats. For example, by clicking on the Doctor icon on the service menu, the user gets a complete listing of all health care professionals. The user can contact them by one-click, can set up an appointment (routine or urgent), can expense the cost of the visit, etc.

The services offered can include, for example, time management through automatic scheduling; for example setting up routine appointments with the doctor; automatic financial management; for example, monitoring all account balance, bill pay; automatic ordering; for example, ordering food for the from local restaurant. These services are enabled though the use of XWC kernel placed at websites which are connected to our automated service and cross-site calendar negotiating algorithms described earlier. Automatic management of lists such as Christmas list, college alumni list, etc. is also easily managed in this design.

Figure 19:
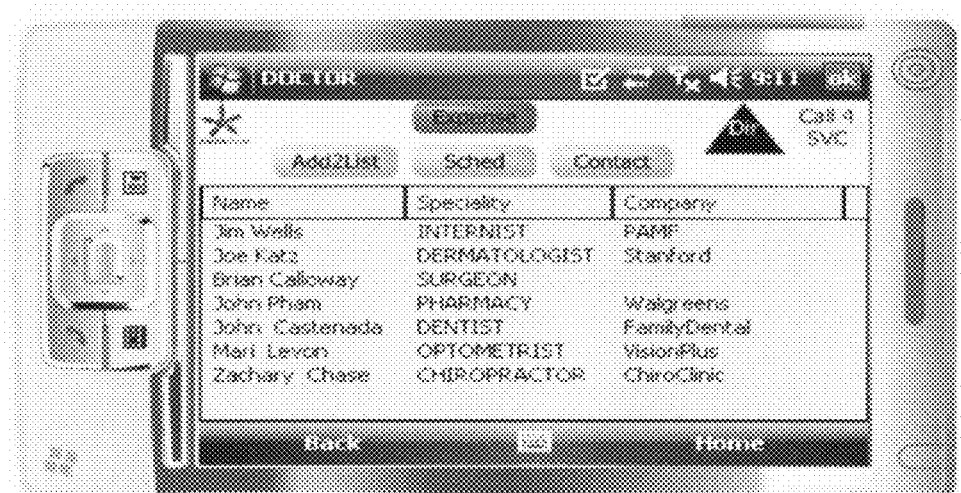
FIG. 19 illustrates a screen in which a user is able to view all medical personnel and perform key functions.
Figure 20:
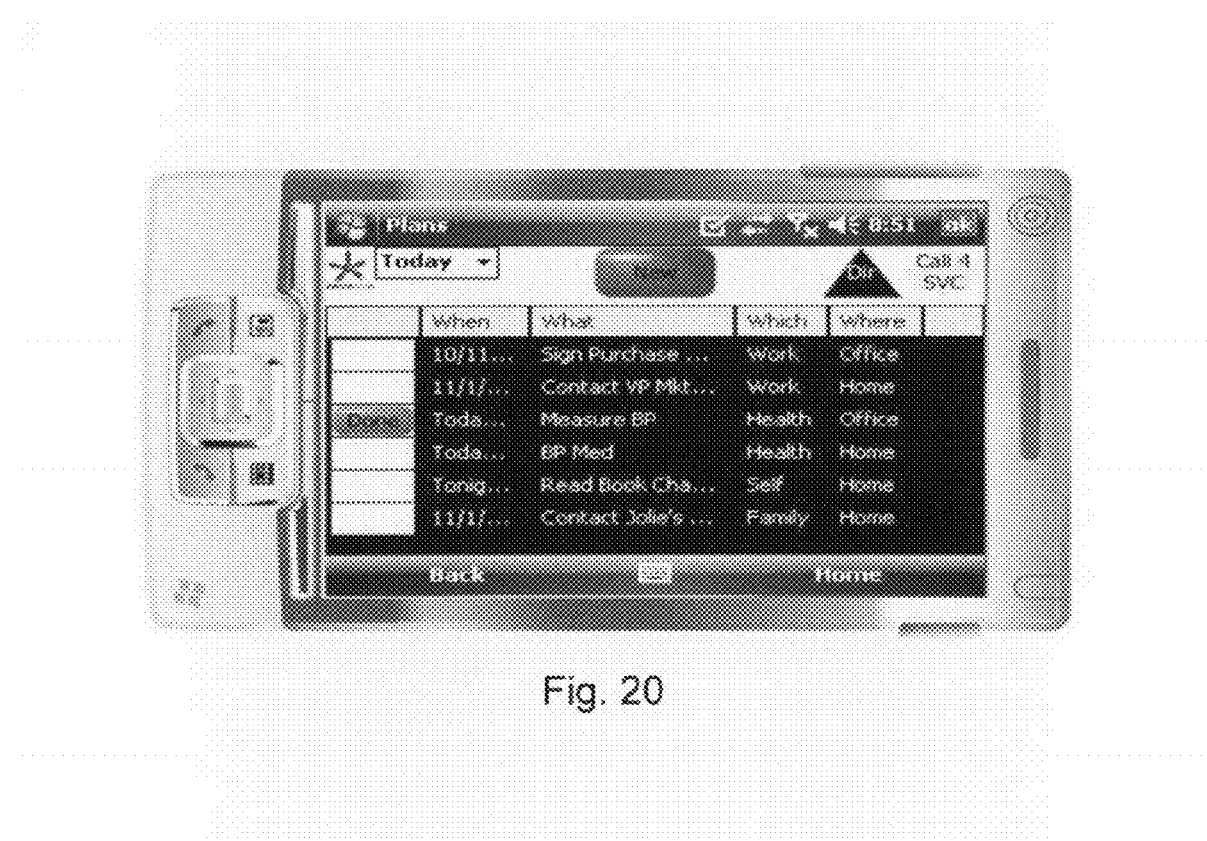
FIG. 20 illustrates a screen in which a user is able to setup, view, update, and track plans.

FIG. 19 illustrates a screen in which a user is able to view all medical personnel and perform key functions. FIG. 20 illustrates a screen in which a user is able to setup, view, update, and track plans. When a task is finished, by pushing on the first column, the word DONE appears on the line and the task is assumed to be complete.

Figure 21:
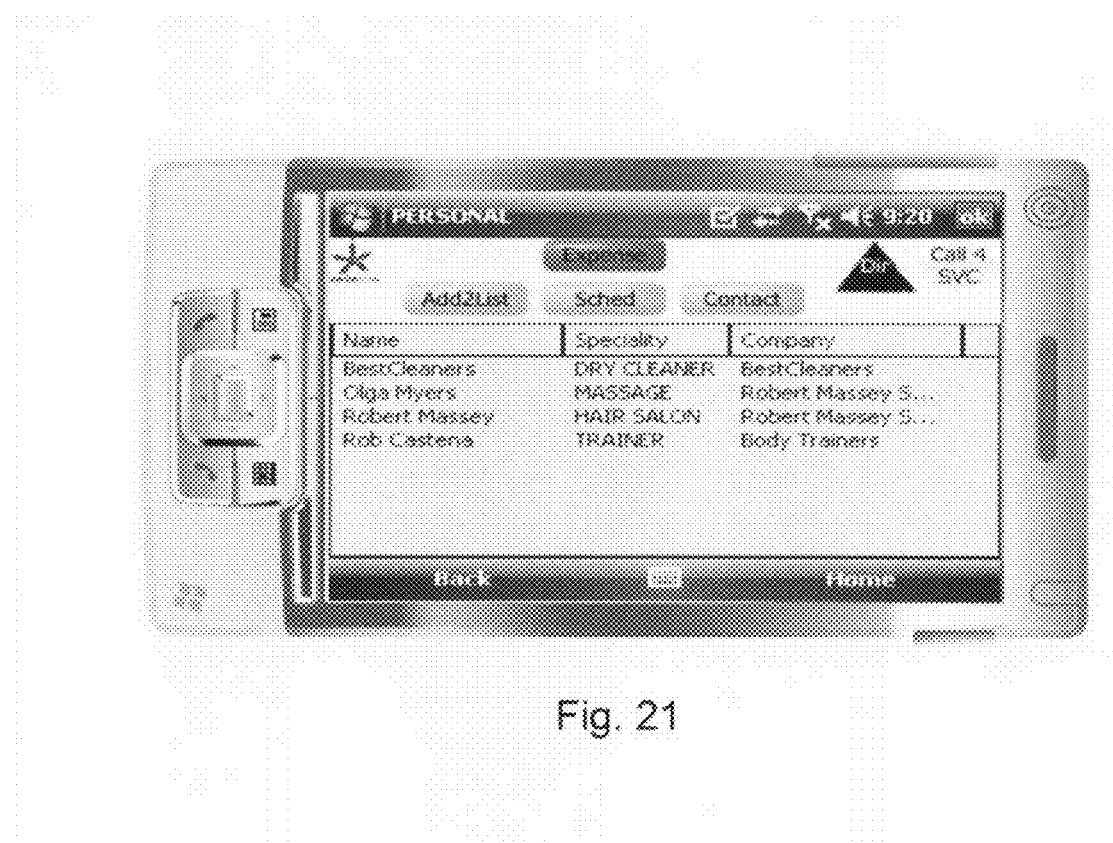
FIG. 21 illustrates a screen in which a user is able to setup multiple classes of personal services and expense costs.
Figure 22:
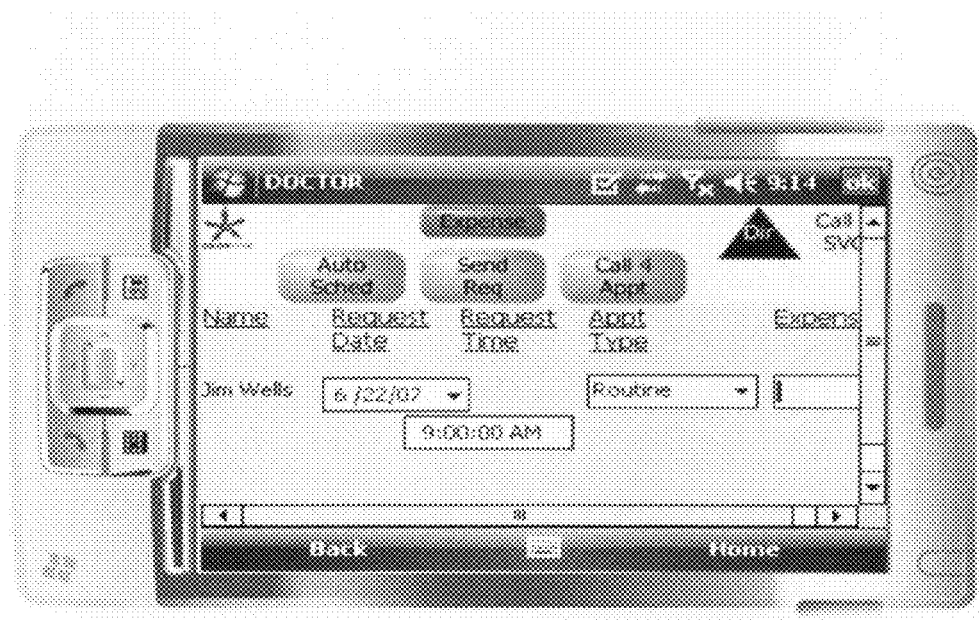
FIG. 22 illustrates a screen in which a user is able to setup multiple classes of automated appointments and expense medical costs.
Figure 23:
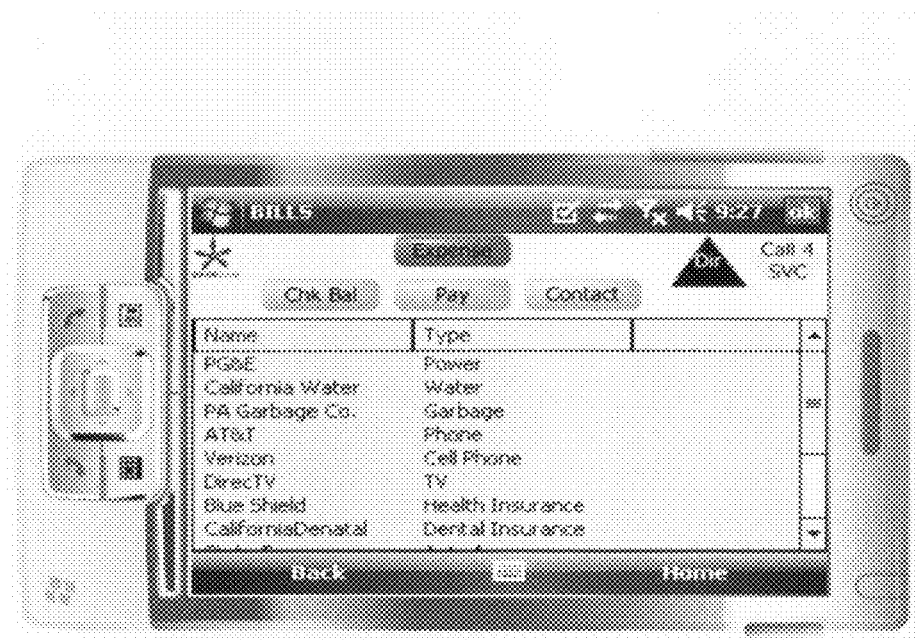
FIG. 23 illustrates a screen in which a user is able to manage bills and expense costs.
Figure 24:
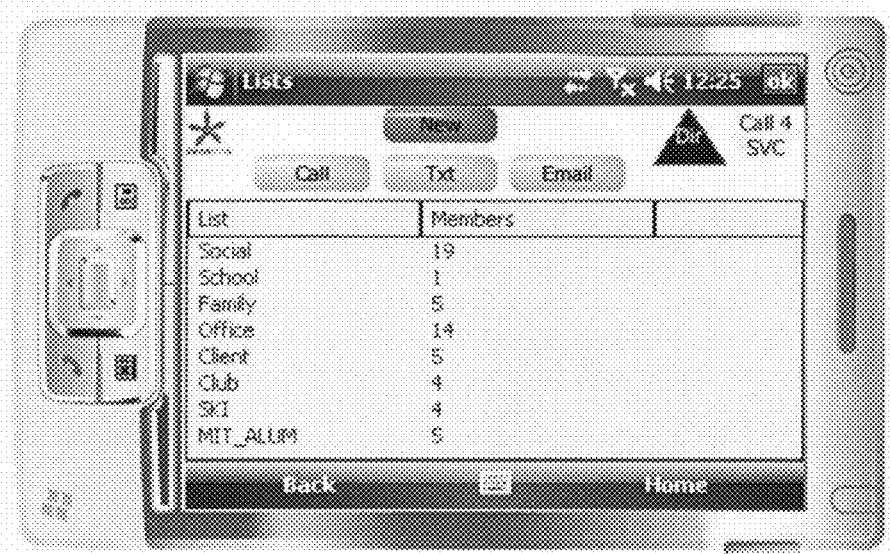
FIG. 24 illustrates a screen in which a user is able to set up, contact, manage lists and relationships.

FIG. 21 illustrates a screen in which a user is able to setup multiple classes of personal services and expense costs. FIG. 22 illustrates a screen in which a user is able to setup multiple classes of automated appointments and expense medical costs. FIG. 23 illustrates a screen in which a user is able to manage bills and expense costs. FIG. 24 illustrates a screen in which a user is able to set up, contact, manage lists and relationships.

The directory collects information on various relationships and the device is able to setup lists based on specific user-defined properties found in the directory. The UI allows the generation of lists and a one-click way of contacting people on the list through phone, messaging or email. In the case of voice calls, the system allows for the user to record a message. The device calls all people on the list sequentially and the user talks on the phone, leaves a voice message, or leaves a voice message automatically with the contents of the pre-recorded message.

Automated Assistant Security

One of the automated tasks that can be performed by the Automated Assistant System is proactive security management. This level of security can be offered through the information collected through the mobile device and available to the system about the user and his activities and anticipated activities. The device is able to detect circumstances that are not on the regular time/space schedule of the owner of the device. Having a direct link between the location and temporal information of the TIBIS engine introduced earlier, the device generates a security level for the present time. Upon changes in any number of these parameters, the device generates a higher alert level. At each new alert level, the device is enabled to perform additional security checks that are only known to the owner of the device. The increased physical information and biological checks are then introduced and in case of a failure, the options predetermined by the user at setup time are undertaken. In one circumstance, the device goes into shutdown and locks the data on the device temporarily so it cannot be accessed but still available to recover. In another circumstance, it downloads the contents of the updated elements on the device on the assigned network space to the client and performs an immediate I/O access shutdown. In another circumstance it is to wipe out all the memory on the device via making it unreadable and unrecoverable by writing a predetermined security pattern on all accessible memory locations. In any of the circumstances the user or other properly designated authorities can be notified of the location coordinates and type of security breach via the cellular network or any available wide-area wireless network available to the device. In case of severe security alert levels, the panic signal is sent to the cellular network server whereby the notifications are then submitted from that access point and the device is rendered inoperable immediately while downloading its latest information to the network center server.

In another implementation, other parameters such as body temperature, moisture, heart-rate, etc. (depending on the capabilities of the device) are also monitored to protect against cases where the authorized user is under duress and is forced to provide the biological identification against his consent. When such conditions are detected and alarm is raised and either access is denied or access is granted but authorities are alerted or access is granted in a revised alarm mode with limited features or special provisions which allows the apparent operation of the device but the data provided access to is diverted to a "clone" database. The clone database can be similar to the actual database but without the ability to modify the real database, or the clone database includes fake data. The choice of action depends on the type of access requested and organizational and user preferences.

Figure 25:
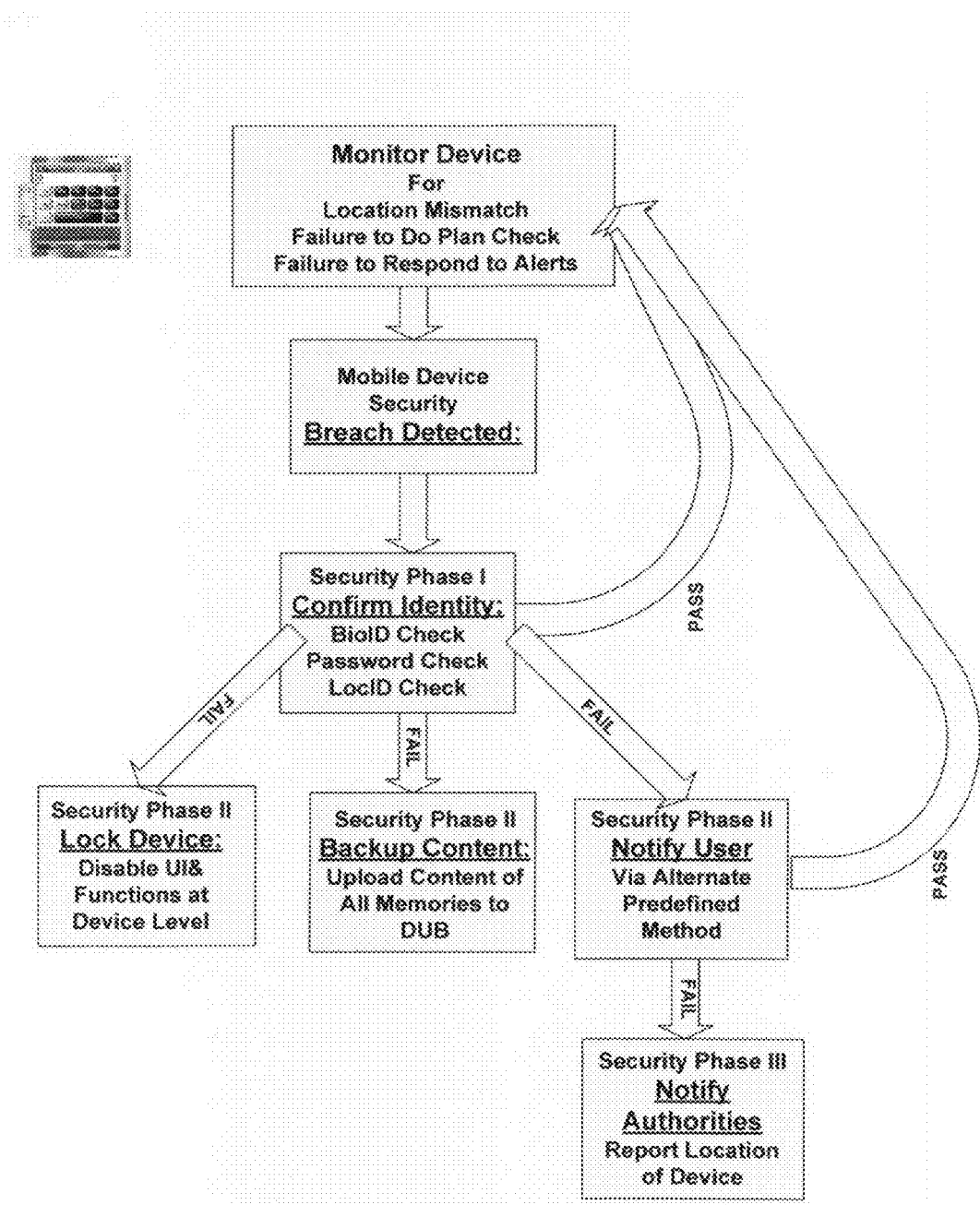
FIG. 25 shows an embodiment of security processes for a mobile device.

In one embodiment the device is continuously monitored while in others it is alerted for security breach due to specific events that arise during normal operation while unexpected due to usage protocol. One embodiment's simplified top-level algorithm is depicted in FIG. 25, which shows security processes for a mobile device.

Automated Assistant System Usage Model Example: Scan in prescription to customized mobile device. Mobile device orders prescription through the pharmacy by automated call or website.

Device notifies user of prescription readiness or arranges by call or web for pickup & delivery.

Automated Assistant System extracts prescription frequency information and places a notification for refill a few days before due date.

Automated Assistant System prompts user for approval of reorder and places reorder w/pharmacy/doctor.

Automated Assistant System saves and tracks all prescriptions taken information in "past/tracking" metrics.

Automated Assistant notifies user of any possible reactions of medications based on a search on a partner's medicine pairings directory.

One of the customized mobile device optional modules is for health monitoring (vital signs). If such an option is used, Automated Assistant gathers and transmits vital signs to the doctor in case of an adverse reaction to the medicine.

(3C) Operating Environment For Electronic & Mobile Device

The following description relates to an operating environment for mobile and electronic devices that allows for significant user input in the final appearance and functionality of user buttons within the use-case scenarios for a given device configuration.

The techniques described in this section (shown specifically for an advanced mobile communication device while applicable to any mobile or stationary consumer electronic device that is predominately used to capture, send/receive, access information and content both user generated as well as publicly accessible forums such as through the world wide web) enable the following capabilities:

The extended set of functionalities available to the user at the user level is possible due to direct hardware mapping of "button functionality" as well as "button locality" and "button visual and audio characteristics" so that without increased delay or additional code required for OS to accommodate such cases as well as increased power consumption, the user gets to "define" the operation and function of the buttons.

In one embodiment, part of the rendering of images of user display is implemented via programmable logic that is reconfigurable at the factory, in post-assembly stage that can add additional modes for the user views and options that the user is able to program directly and on the fly through the use of extended UI memory area and the GSM control blocks.

In one embodiment of this invention, the user is able to choose up to 15 different functional buttons to be displayed for each page of the interface. Each user button performs a specific user function and in some cases directs the user to additional choices/pages. The user is able to modify the placement, looks as well as the functionality associated with those buttons chosen from a larger set of available functional options that the device is designed to perform depending on user's need at the time. These buttons are later able to be reprogrammed as user's needs change. In addition to static buttons, the user is also able to choose dynamic buttons as well as other graphical or user-generated icons, contents, avatars to enable user access as well as provide for customization of the device environment.

Currently users are able to change only superficial levels of interface in a limited fashion such as colors and ring-tones. The actual user interface parameters are dictated by standardized operating systems that for the majority resemble identical environments for everyone as in the personal computer desktop market. As the OS used on the device changes so does the basic parameters of the interface.

In this technique, the user is able to change the look and feel of the device based on a set of customized functionality the device is designed to run while providing for additional functions and buttons as new modules and programs are added to the system.

By making the user interface a primary "functionality" of the device and not part of a standardized operating system, this technique decouples the standard directory structure and file system from the user interface of the electronic device. The device user interface is designed for consumer mobile applications in its preferred embodiment and as such is optimized to minimize the number of steps necessary for performing functions on the go. By allowing the user to program the functions and sequence of buttons for their specific use-cases, significant time savings is achieved in performing user functions as well as a longer battery life can be achieved due to less time used on power-hungry display time when allowing the user to reach their most frequently used functionality by going through the minimum number of key strokes or touches or vice commands.

Figure 26:
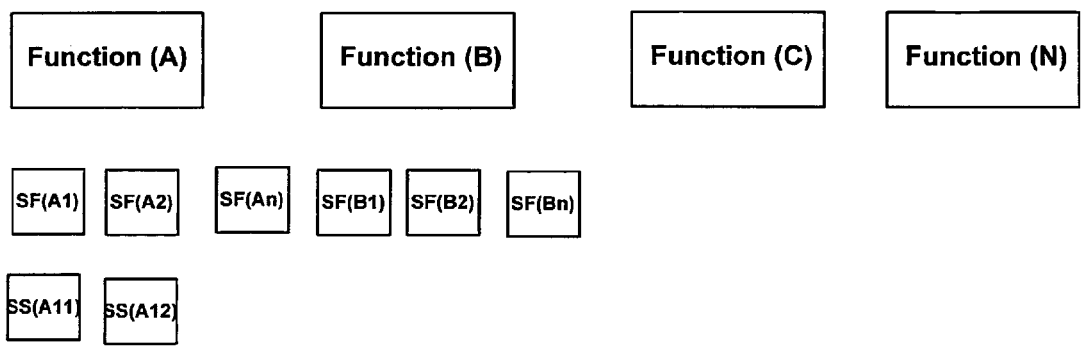
FIG. 26 shows multiple levels of functions in the user environment hierarchy.

FIG. 26 shows multiple levels of functions in the user environment hierarchy. In one embodiment, the functional options are viewable in a directory structure, site map or visual button display. In each case the user reviews the list as presented and prioritizes the functional choices to appear at each level of user interface. Additionally, the user can pre-define the method of activation for each functional button (e.g., voice, touch, secure-touch, visual id, just to name a few).

Additional choices are available to the user depending on the specific contents of the page allowing for the same level of customization on an inter-page bases as well as the intra-page case shown above.

In one embodiment the user environment is presented to the user at the lowest level of the software stack; as a result, the changes made are robust and immediately available for use. This is in contrast to changes that need to take affect at the higher levels of abstraction. The performance and the corresponding mapping to device functionality are most efficient in this case.

Figure 27:
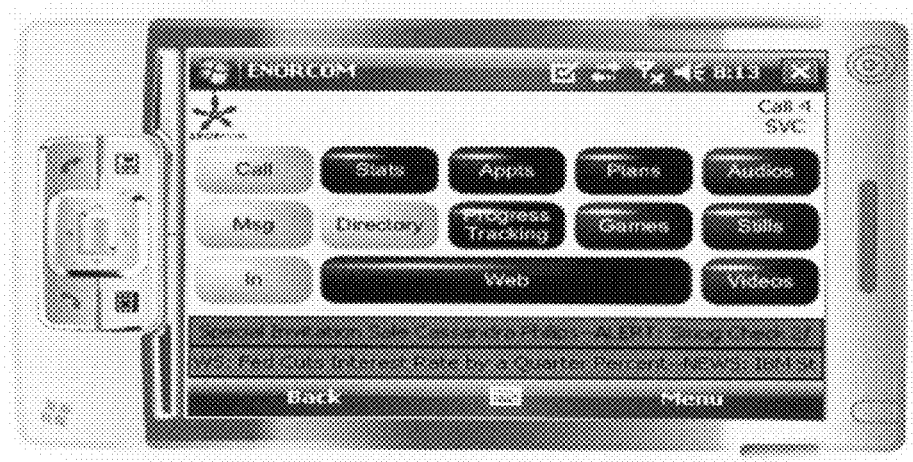
FIG. 27 shows a unified top-level view in a UI of a mobile device.

Examples of some features of the UI are shown in the screens of an advanced mobile device illustrated in FIGS. 27 through 30. FIG. 27 shows a unified top-level view in a UI of a mobile device. More specifically, FIG. 27 shows that the user has access to up to 15 customizable buttons. The user has access to all communication, user content, and events in one unified view on one screen simultaneously. In addition, the user can access all relevant statistics, current schedule of activities and future plans from one screen with one click, as well as view progress tracking of plan.

Figure 28:
FIG. 28 shows a customized call for service menu.

After clicking on "call4svc", the user gets access to a number of services simultaneously. The user can choose the services of interest and how they appear on the screen. The following demonstrative samples:

FIG. 28 shows a customized call for service menu. The user can view multiple service choices simultaneously while keeping abreast of critical machine generated alerts and news bulletins. Under each category of service, the user is able to define the particular service, create appropriate shortcuts for such services which are directly hardwired into the device for robust performance. These services form the basis of "Events Repository" shown in another figure managed by the GSM block intelligence.

As can be seen, the user can program additional conditions for "specific event" notifications such as urgent messages or occurrence as well as ongoing news and selected advertising feeds "at users' discretion" to be displayed in various forms upon the user interface.

The core engine has removed all the dependencies and traditional OS management tasks from its functionality and it has created a large array of UI related functional hardware blocks such as the UI register file and memory containing various user interfaces and their modifications in reconfigurable and hardware mapped memory blocks. The Alert and News bars can be closed on any screen or all of them.

Figure 29:
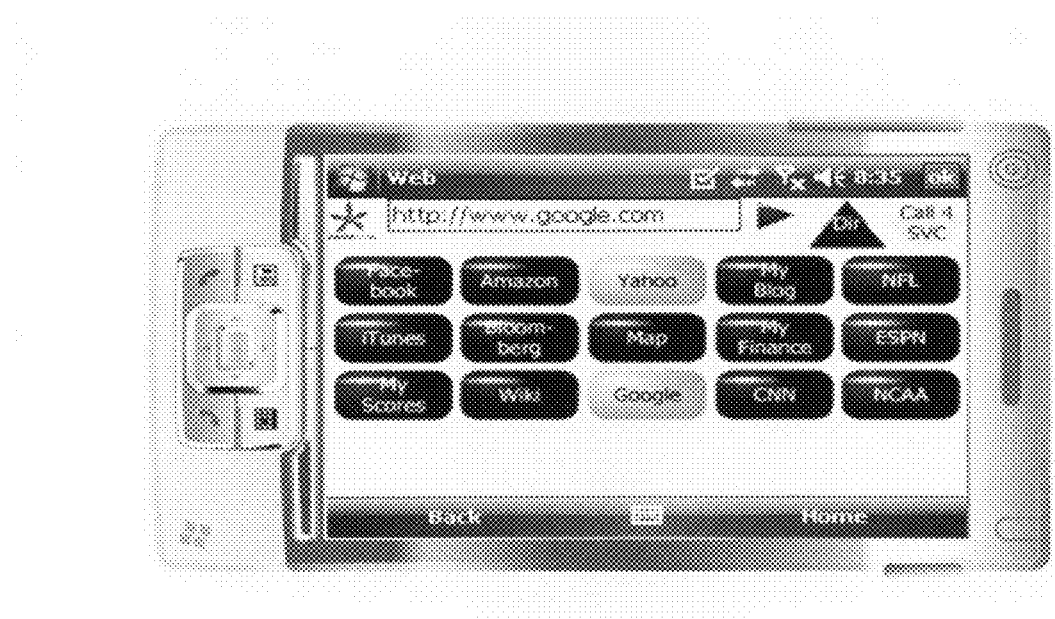
FIG. 29 shows a screen for customized website access.

FIG. 29 shows a screen for customized website access. The user is able to view up to 15 user-programmable one-touch websites access buttons.

(4) Integrated Communication (4A) Communications Management Center

The mobile device operates as a central location for access and management of all communication services of interest to the user—including land-line and mobile voice mail, email, and messaging services. The device has access and displays all incoming voice/text message and emails no matter where they were sent to (e.g. home or office landline mailbox or mobile mailbox). The user selects the mailboxes to be included in the system. This capability is used by the active secretary to allow the user unified access to all messaging that is of interest to the user. The user can manage all messaging channels from the mobile device.

The voice, MMS, and email accounts to be monitored are initially registered on the system by the user and proper authorizations are established (e.g. password, etc.) The system allows for customized combinations of push and pull transmit and receipt mechanisms. Pull services download the requested messages to the device at time intervals specified by the user. Push services push messages onto the device as they are received. The system allows for designation of specific attributes in the messages to trigger the message to be pushed onto the device and an alert to be generated and sent to the user. The designation can include a specified phone number, email address, email account, topic or key word in the message, etc. Any of these designated messages will be pushed onto the device while all other messages will be treated by the normal policy set by the user.

The system acts as a personal gateway for all messages for the user and manages and routes messages according to user requirements and specification.

In one embodiment, the designated phone numbers are handled differently according to the location of the mobile device. For example, when the mobile device is at a location away from home, home calls are routed to the voice message center. When the mobile device is in the home location, home voice calls are routed to the home phone.

In this invention, multimedia messages are embedded in voicemail. A user can leave a voice message and include a multimedia file in the message. This is accomplished in any of several ways. In the case of a VoIP call, the voice transmission is done using data transmission technologies. In this case, the transmitting device being the aforementioned mobile device can use the captured or generated multimedia content to attach to such call. In case of pure cellular call scenarios where the call is going through cellular base stations as well as potentially a number of VoIP land connections, as long as data-capable digital networks are used, the multimedia transmission is carried through with the call.

Figure 30:
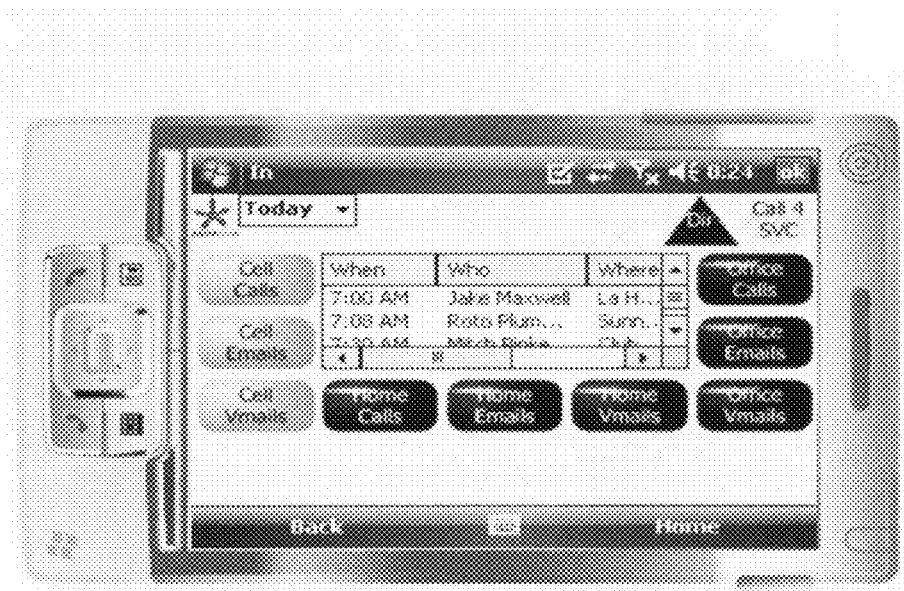
FIG. 30 shows a unified communication messaging screen on a mobile device.

FIG. 30 shows an example of a unified communication messaging screen on a mobile device. The user has access to all mobile and landline calls, emails, and voicemails in one place and can access them with one click of the assigned hot-buttons. Pressing any hot button will display the details of the messages from the given source.

(4B) Location ID in Mobile Environment

In this system, a Location ID is included in every incoming call. Currently, every phone call (whether landline or mobile) is enabled with a Caller-ID service which provides the phone number where the call was originated from and the subscriber's name on the billing statement. The Caller ID service is provided by the landline phone service provider, based on the caller number received by the telephone switch. This data is then modulated as a data stream and usually sent between the first and second rings before the phone is picked up. The caller's name determined by the service at the terminating central office by looking up service provider's of third-party databases and this information is sent along with the phone number information to the recipient.

Figure 31:
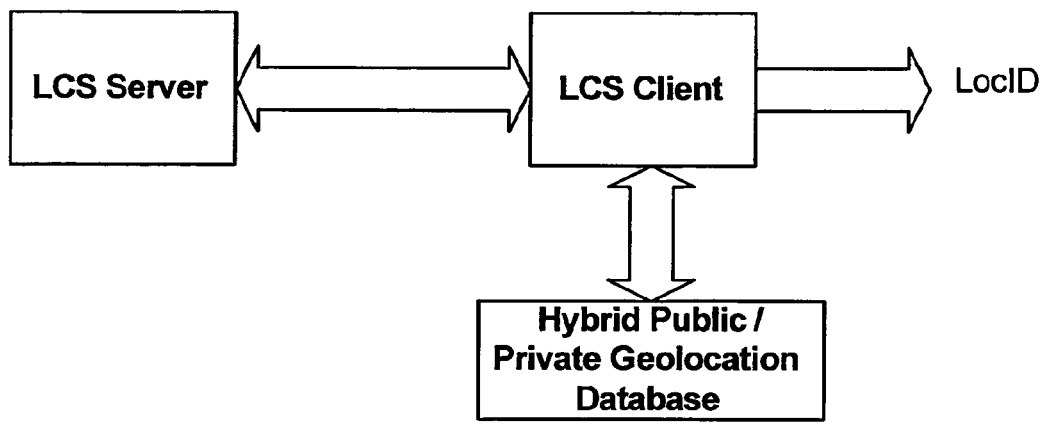
FIG. 31 shows the relationship between an LCS client, an LCS server and a hybrid public/private geolocation database.

In this system, in addition to Caller-ID, each call is enabled with a Location-ID, which identifies where the call was originated from. For land-line based calls, location is fixed and is generally understood from the Caller ID information. For mobile based calls, the Caller ID information identifies the person who originated the call, but does not have information about the location where the call was originated from. The Location-ID is derived from the location information available from the network and/or device. The Automatic Location Information (ALI) can be derived from network-based techniques, or network-assisted GPS, or directly from GPS data available on the phone, depending on the device and network capabilities. Referring to FIG. 31, the ALI is requested by the Location Service (LCS) client from the Public Land Mobile Network (PLMN) LCS server. The location is translated to a logical location that is of value to the user. Public and private databases, including geo-location directories are used to translate the location to a meaningful physical location. Depending on the precision of the location, the location can be as wide as a geographical location such as a city, or a neighborhood, or it can be as precise as a particular location such as a business establishment.

The Location ID is sent to the user as a prefix or post-fix to the phone Caller ID, or it is sent intermittently with the Caller ID (Caller ID, LocID), or is embedded in the name field along with the name. At the user's personal network access or device, the LocID is translated to a location that is personal to the user based on personal information of the user.

(4C) Convenient Call Processing in Mobile Environment

The user has the convenience of using one mobile device to send and receive calls on multiple phone numbers. This can be accomplished by including multiple subscriber information on the subscriber identity module.

The user has the ability to use one phone number attached to several different mobile devices. This would be the case when for a variety of reasons a user may want to receive mobile calls on different devices. The devices have to be registered on the system appropriately such that outgoing calls are accounted for properly, and incoming calls are routed appropriately by the MSC. In most mobile systems, the network includes location registries to keep track of mobile devices on the system. For example, the home location registry (HLR) keeps track of devices on the network in a given geographical area. The devices are identified by unique identifiers that describe the specific physical device as well as the phone number associated with that device. Under normal circumstances, each phone number is uniquely associated with a device. In this invention, a phone number is allowed to be associated with multiple "cloned" devices. All cloned devices have to be uniquely identified as clones so that at any point in time, only one device can initiate a phone call or receive an incoming call. In a mobile network, each mobile device is identified with two unique numbers; the mobile identification number (MIN), which corresponds to the assigned phone number, and the electronic serial number (ESN). In one embodiment, the cloned identifier is embedded in the phone's ESN. The ESN is a 32-bit number that consists of an 18-bit serial number, an 8-bit manufacturer code, and 6 reserved bits. In one embodiment, 2 of the reserved bits are used to indicate up to 3 additional cloned devices: 00→no clones, 01→clone 1, 10→clone2, 11→clone 3.

Additional bits can be used if more clones are needed but for most practical cases up to 3 clones is sufficient. The ESN is generally set at the factory but the clone bits are made to be modified in the field to allow for dynamic programming of the clones as needed. This is generally done along with the assignment of the mobile phone number to the device.

When incoming calls come in, the network looks up the location of all the mobiles in the home database which have the same phone number associated with them, this includes all the cloned devices. The paging signal is sent to all cell sites where the device or any of its clones are registered. The network routs the calls to all registered mobiles which are on at the time and answer the page signal. Once the call is picked up by one of the mobile devices, the call is routed to that mobile and the conversation/data transfer is initiated. The call to all other mobiles is dropped and those mobile devices are deactivated (i.e. they can not initiate or receive any calls). Once the call is finished and the active mobile device goes back into idle mode, all other mobile devices are activated and go back to the idle state. Once one of the mobiles initiates a call, the other cloned devices are deactivated and stay deactivated until the call is finished at which time they all go back to the idle mode.

Thus, in certain embodiment, the UI of a mobile device provides the following features and functionality:

(0) Access to entertainment, communications and organizational functions viewable together at once, (1) One step (one touch, one click) access to all contents stored by category or type.

(2) One step access to Message Inbox content from multiple sources in a unified as well as simultaneously categorized by source in various date grouping formats.

(3) Access to pre-programmed hot-buttons for all calling and messaging options.

(4) One step access to Integrated, Detailed, Tagged and Cross-Referenced Directory of Personal, Business and Service relationships with access to a programmable set of hot button category listings.

(5) One step access to calling and various messaging categories from unified or categorized Directory listings.

(6) Capability to drag and drop directory entries from one unified listing to specific category listings.

(7) Once step access to a user-programmable set of (in the shown embodiment, 15) websites once in web access mode.
(8) One step viewing of appointments based on time groupings, location groupings with NOW button specifying the current time and indicating next appointment.
(9) One step viewing of personal calendar based on multiple user-selected categories as well as one step viewing of shared calendars (i.e., user defined family members, etc.) once in Appointment viewing mode.
(10) One step viewing of user-defined and machine calculated statistics in various time groupings; Category based Statistics viewing in one step once in Stats Mode.
(11) One step viewing of user-defined and machine tracked progress on goals in various time groupings; Category based Progress Tracking in one step once in PT mode.
(12) Once step viewing of user-defined and user-tracked and machine calculated Plans in various time groupings with machine auto-calculation via one step DONE button.
(13) One step access to a number of user-defined services (12-15 in shown embodiments) such as personal, financial, social, informational with one step access to features such as "auto-scheduling", "live-scheduling", "recurring-scheduling", "expense", "pay", "check balance", "transfer funds", "group call", "group msg", "group lists" once in that service category mode.
(14) Once step access to set up multiple categories of Alerts and News in the following categories: Money, Time, Event (Health related as well as other events of interest)
(15) One step enabling, disabling of Alerts and News information bars on screen as well as one step set up of such activities once in Alert/News mode of operation.

Thus, the techniques and features described above include the following:

A method of capturing and scheduling user-requested personal services via a mobile device, an electronic access device or the worldwide web.

A method of automated information exchange via any common format for the purpose of scheduling individual calendar entries via a mobile device, telephone or world wide web initiated data or voice communication channel.

A mobile device enabling the sharing of schedules among a set of users of services with dynamically updated timing and event information as included in a user's profile.

A mobile device service enabling proactive collecting of information relevant to the user based on user input, past activity, current schedule and/or future plans.

A mobile device performing security breach anticipation and a multi-level security breach handling procedure based on user location, activity, proximity, environmental and/or biological information.

The techniques introduced above can be implemented in software and/or firmware in conjunction with programmable circuitry, or entirely in special-purpose hardwired circuitry, or in a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A data system in an electronic device, comprising:
one or more data repositories, each comprising a data memory and a tag memory for data stored in said data repository,
a multi-level temporal memory system comprising at least two memories, a first-level memory designated as short-term memory and a highest-level memory designated as long-term memory,
a processing element, operably connected to said data repositories and multi-level temporal memory system,
wherein said data memory includes received, transmitted or generated data elements from activities, multimedia fries or communications within said device,
wherein said tag memory includes data tags corresponding to content metadata including temporal, geographic, context or user-defined parameters for each data element stored in said repository,
wherein said processing element stores data tags corresponding to data elements received, transmitted or generated within a predefined and dynamically variable temporal granularity within said system, in a time snapshot,
wherein said processing element further assembles a time-based sequence of said time snapshots and stores said time-based sequence in said short-term memory,
wherein said processing element allows modification or deletion of data tags in each said time snapshot in short-term memory only during a predefined and user-configurable inspection period,
wherein said processing element transfers each said time snapshot in short-term memory to a first next level memory after said inspection period, wherein after a second longer inspection period, during which data tags in said time snapshot can further be modified or deleted, said time snapshot is transferred to a second next higher level memory, until said time snapshot is transferred to the highest-level memory, long-term memory, and
wherein data tags in each said time snapshot in said long-term memory are stored along with their corresponding data elements from said data repositories.

2. The system of claim 1, wherein said data repositories and temporal memories reside on the device, on a data network, or combinations thereof.

3. The system of claim 1, wherein at least one of said repositories or temporal memories is detachable from the device.

4. The system of claim 1, wherein data elements and data tags in said long-term memory cannot be modified or deleted.

5. The system of claim 1, wherein said successive time snapshots in each temporal memory in the multi-level temporal memory system are positioned in a set of physically contiguous or adjacent blocks of memory.

6. The system of claim 1, wherein the processing element dynamically updates or expands said data tags based on at least one of user preference, usage pattern, character/pattern/voice/image-recognition of the corresponding data element or portions of the data element, or other user-defined criteria.

7. The system of claim 1, wherein the processing element further performs expedited information retrieval by generating a search tag according to user-preferences, and progressively compares said search tag with data tags at each level of memory in the multi-level temporal memory system, starting at short-term memory and moving up the memory hierarchy.

8. The system of claim 1, wherein said processing element using the time-based sequence of time snapshots stored in said temporal memory system, forms a temporal digital journal of system user's activities, communications and content during a specified time period.

9. A mobile electronic device comprising:
one or more memory elements, each comprising a dedicated data memory and dedicated tag memory, wherein said data memory includes received, transmitted or generated data elements from activities, multimedia files or communications within said device, and wherein said tag memory includes data tags corresponding to content metadata including temporal, geographic, context or user-defined parameters for each data element stored in said data memory,
a two-level temporal memory system comprising a short-term memory and a long-term memory,
a processing element operably connected to said memory elements and said temporal memory system,
wherein said processing element stores data tags corresponding to data elements received, transmitted or generated in a predefined and dynamically variable temporal granularity within said device, in a time snapshot,
wherein said processing element further stores a time-based sequence of said time snapshots sequentially in said short-term memory,
wherein said processing element allows modification or deletion of data tags in each said time snapshot in short-term memory only during a predefined and user-configurable inspection period,
wherein said processing element transfers each said time snapshot in short-term memory to said long-term memory after said inspection period, and
wherein data tags in each said time snapshot in said long-term memory are stored along with their corresponding data elements from said memory elements.

10. The device of claim 9, wherein at least one of said temporal memories is detachable from the device.

11. The device of claim 9, wherein said data repositories and temporal memories reside on the device, on a data network, or combinations thereof.

12. The device of claim 9, wherein said mobile device further comprises an attached or remote display, and wherein said processing element using the time-based sequence of time snapshots stored in said temporal memory system, forms a temporal digital journal of user's activities, communications and content during a specified time period, and further making viewable said journal on said device's display.

13. The device of claim 9, wherein the processing element further performs expedited information retrieval by generating a search tag according to user-preferences, and progressively compares said search tag with data tags at each level of memory hierarchy, starting at short-term memory and moving up the memory hierarchy to long-term memory.

14. A data system in an electronic device, comprising:
one or more data repositories, each comprising a data memory,
a multi-level temporal memory with at least two memories, a first-level memory designated as short-term memory and a highest-level memory designated as long-term memory,
a processing element, operably connected to said data repositories and multi-level temporal memory system,
wherein said data memory includes received, transmitted or generated content data from activities, multimedia files or communications within said device,
wherein said processing element stores data received, transmitted or generated within a predefined and dynamically variable temporal granularity within said system, in a super block designated as a time snapshot,
wherein said processing element further stores a time-based sequence of said time snapshots sequentially in said short-term memory,
wherein said processing element allows modification or deletion of data in each said time snapshot in short-term memory only during a predefined and user-configurable inspection period,
wherein said processing element transfers each said time snapshot in short-term memory to a first next level memory after said inspection period, wherein after a second longer inspection period, during which data in said time snapshot can further be modified or deleted, said time snapshot is transferred to a second next higher level memory, until said time snapshot is transferred to the highest-level memory, long-term memory, and
wherein one or more memories in said multilevel temporal memory system is optionally detachable from said device.

15. The system of claim 14, wherein each unit of said data memory has a data element and a corresponding data tag representing content metadata with at least one of temporal, geographical, location, context, and user-defined parameters, wherein each level of memory in the multi-level temporal memory system contains progressively more detailed data tags and data, wherein said processing element stores only high-level tags in short-term memory, and stores partial data and more detailed tags in intermediate levels of memory, and stores all data tags and the corresponding data elements in said long-term memory.

16. The system of claim 15, wherein the processing element further performs expedited information retrieval by generating a search tag in accordance with user-preferences, and progressively comparing said search tag with data tags at each level of memory hierarchy, starting at short-term memory and moving up the memory hierarchy to long-term memory.

17. The system of claim 15, wherein said processing element using the time-based sequence of time snapshots stored in said temporal memory system, forms a temporal digital journal of system user's activities, communications and content during a specified time period.

18. The system of claim 14, wherein said data repositories and temporal memories reside on the device, on a data network, or combinations thereof.

19. A data method in an electronic device, comprising:
storing data elements including received, transmitted or generated data from activities, multimedia files, and communications within said device and their corresponding data tags including content metadata including temporal, geographic, context or user-defined parameters for said data elements in a data repository, assembling a multi-level temporal memory system with at least two memories, a short-term memory and a long-term memory, storing data tags corresponding to data elements received, transmitted or generated within a predefined and dynamically variable temporal granularity within said device in a time snapshot, assembling a time-based sequence of said time snapshots and storing said time-based sequence in said short-term memory, allowing modification or deletion of data tags in each said time snapshot in short-term memory only during a predefined, and user-configurable inspection period, after said inspection period, transferring data tags in each said time snapshot along with its corresponding data element from said data repository to said long-term memory.

20. The method of claim 19, wherein said inspection time is zero, forming said short-term memory and long-term memory simultaneously.

21. The method of claim 19, wherein data elements and data tags in said long-term memory cannot be modified or deleted.

22. The method of claim 19, further creating a data hole in long-term memory upon deletion of data elements or data tags in long-term memory by preventing the corresponding memory location from being re-used.

23. The method of claim 19, further performing expedited information retrieval by generating a search tag according to user-preferences, progressively comparing said search tag with data tags at each level of memory in the multi-level temporal memory system, starting at short-term memory and moving up the memory hierarchy.

24. The method of claim 19, further generating a temporal digital journal of system user's activities, communications and content during a specified time period by using the time-based sequence of time snapshots stored in said temporal memory system.

25. A data system in an electronic device, comprising:
one or more memory elements to store data, wherein each stored data in said memory element includes a data element and a tag element, with each data element including received, transmitted or generated data from activities, multimedia files or communications within said device, and each tag element includes content metadata including temporal, geographic, context or user-defined parameters for each corresponding data element stored in said memory element, a temporal memory, a processing element, operably connected to said memory elements and said temporal memory, a display, wherein said processing element stores each said data element and the corresponding said tag element for each unit of data in said memory element together in a predetermined area of memory in physically contiguous or adjacent data blocks, wherein said processing element stores tag elements corresponding to data elements received, transmitted or generated within a predefined and dynamically variable temporal granularity within said system, in a super block designated as a time snapshot, wherein said processing element further stores a time-based sequence of said time snapshots sequentially in said temporal memory, wherein said processing element using the time-based sequence of time snapshots stored in said temporal memory system, forms a temporal digital journal of user's activities, communications and content during a specified time period, and further making viewable said journal on said display.

26. The method of claim 25, wherein said tag elements are dynamically updated or expanded based on at least one of user preference, usage pattern, character/pattern/voice/image-recognition of corresponding data elements or portions of said data elements, or other user-defined criteria.

27. The system of claim 25, wherein said successive time snapshots in said temporal memory are positioned in a set of physically contiguous or adjacent blocks of memory.

28. The method of claim 25, wherein the temporal granularity includes hierarchical time sectors with finer resolution time steps inside another time step.

29. The method of claim 25, wherein the processing element further performs expedited information retrieval by generating a search tag according to user-preferences, and directly comparing by hardware said search tag with tag elements in each said memory element.

30. The system of claim 25, wherein said temporal memory is detachable from said device.

31. The system of claim 25, wherein said display unit is a remote display connected to the device through a communication link.

* * * * *

UNITED STATES PATENT AND TRADEMARK OFFICE
CERTIFICATE OF CORRECTION

PATENT NO. : 8,495,020 B1  
APPLICATION NO. : 12/163973  
DATED : July 23, 2013  
INVENTOR(S) : Nasserbakht et al.

Page 1 of 1

It is certified that error appears in the above-identified patent and that said Letters Patent is hereby corrected as shown below:

On the Title Page

Item (75), in column 1, "Inventors", line 1, delete "N" and insert --N.--, therefor In the Claims In column 24, line 30, in Claim 1, delete "fries" and insert --files--, therefor In column 27, line 13, in Claim 19, after "period,", insert --and--, therefor In column 28, line 19, in Claim 25, after "memory,", insert --and--, therefor Signed and Sealed this  
Second Day of December, 2014

Michelle K. Lee  
*Deputy Director of the United States Patent and Trademark Office*